United States Patent
Florescu et al.

(10) Patent No.: US 11,454,740 B2
(45) Date of Patent: Sep. 27, 2022

(54) COMPOSITION COMPRISING A THREE-DIMENSIONAL AMORPHOUS TRIVALENT NETWORK

(71) Applicant: University of Surrey, Guildford (GB)

(72) Inventors: Marian Florescu, Guildford (GB); Steven Richard Sellers, Guildford (GB)

(73) Assignee: University of Surrey, Surrey (GB)

( * ) Notice: Subject to any disclaimer, the term of this patent is extended or adjusted under 35 U.S.C. 154(b) by 902 days.

(21) Appl. No.: 16/074,757

(22) PCT Filed: Jan. 31, 2017

(86) PCT No.: PCT/GB2017/050240
§ 371 (c)(1),
(2) Date: Aug. 1, 2018

(87) PCT Pub. No.: WO2017/134424
PCT Pub. Date: Aug. 10, 2017

(65) Prior Publication Data
US 2019/0041548 A1 Feb. 7, 2019

(30) Foreign Application Priority Data
Feb. 2, 2016 (GB) .................................. 1601838.4

(51) Int. Cl.
*G02B 1/00* (2006.01)
*G02B 6/122* (2006.01)
(Continued)

(52) U.S. Cl.
CPC .............. *G02B 1/005* (2013.01); *C01B 33/02* (2013.01); *C01B 33/12* (2013.01); *C01F 7/02* (2013.01);
(Continued)

(58) Field of Classification Search
CPC .................. G02B 1/005; G02B 6/1225; G02B 2207/101; C01F 7/02; C01B 33/12
See application file for complete search history.

(56) References Cited

U.S. PATENT DOCUMENTS 9,207,357 B2    12/2015   Steinhardt et al.
2002/0048289 A1  4/2002   Atanackovic et al.
(Continued)

FOREIGN PATENT DOCUMENTS

GB    2113663 A    8/1983
WO    2011/005530 A2    1/2011

OTHER PUBLICATIONS

Intellectual Property India, Examination Report, dated Jul. 9, 2020.
(Continued)

*Primary Examiner* — Bijan Ahvazi
(74) *Attorney, Agent, or Firm* — Umberg Zipser LLP; Ryan Dean

(57) ABSTRACT

The invention provides a composition comprising a three-dimensional amorphous trivalent network which reduces the number of modes within a particular frequency range ($\omega_c \pm \Delta\omega$). The invention also extends to use of the composition as a structural colouration material and a paint, dye or fabric comprising the structural colouration material. Additionally, the invention extends to use of the composition as an optical filter or as a supporting matrix configured to define at least one optical component, such as a frequency filter, light-guiding structure for a telecommunications application, an optical computer chip, an optical microcircuit or a laser comprising the supporting matrix.

16 Claims, 15 Drawing Sheets

(51) Int. Cl.
*C01B 33/12* (2006.01)
*C01F 7/02* (2022.01)
*C01G 25/02* (2006.01)
*C01B 33/02* (2006.01)
*C08K 3/013* (2018.01)
*B82Y 20/00* (2011.01)

(52) U.S. Cl.
CPC .............. *C01G 25/02* (2013.01); *C08K 3/013* (2018.01); *G02B 6/1225* (2013.01); *B82Y 20/00* (2013.01); *G02B 2207/101* (2013.01)

(56) References Cited

U.S. PATENT DOCUMENTS

2009/0020897 A1 1/2009 Winkler et al.
2014/0366647 A1 12/2014 Steinhardt et al.

OTHER PUBLICATIONS

European Patent Office, Communication Pursuant to Article 94(3) EPC, dated May 26, 2020.
Maldovan et al., "Three-Dimensional Dielectric Network Structures With Large Photonic Band Gaps", Applied Physics Letters, Dec. 2003, vol. 83, No. 25, 22, pp. 5172-5174.
Barkema et al., "High-quality continuous random networks," Physical Review B, Aug. 2000; 62(8):4985-4990.
Edagawa, Keiichi, "Photonic crystals, amorphous materials, and quasicrystals," Sci. Technol. Adv. Mater., 2014; 15(3); 15 pgs.
Edagawa et al., "Photonic Amorphous Diamond Structure with a 3D Photonic Band Gap," Physical Review Letters, 2008; 100(1):013901-1-013901-4.
International Search Report and Written Opinion for Application No. PCT/GB2017/050240 dated May 9, 2017; 13 pgs.
Maldovan et al., "Three-dimensional dielectric network structures with large photonic band gaps," Applied Physics Letters, 2003; 83(25):5172-5174.
GB Intellectual Property Office Search Report for GB patent application No. GB1601838.4; dated Jul. 29, 2016.

Figure 3
(a) 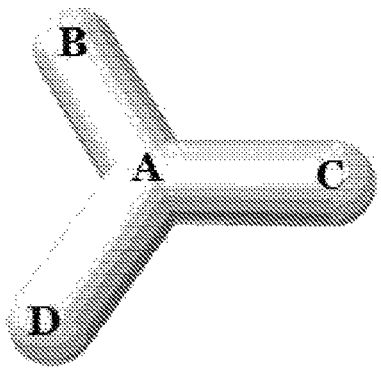
(b) 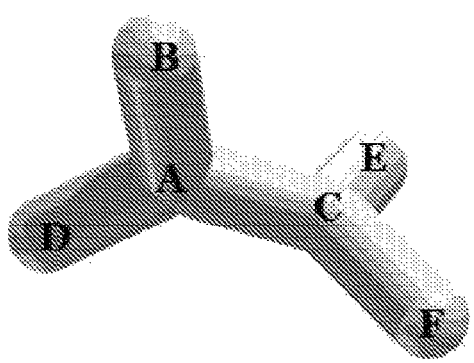
Figure 4
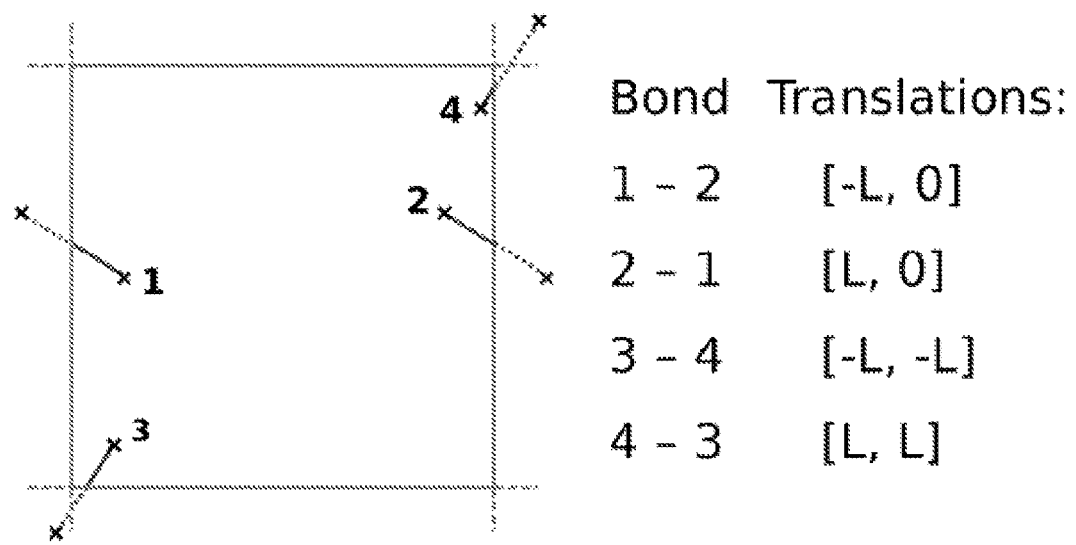

Figure 7a
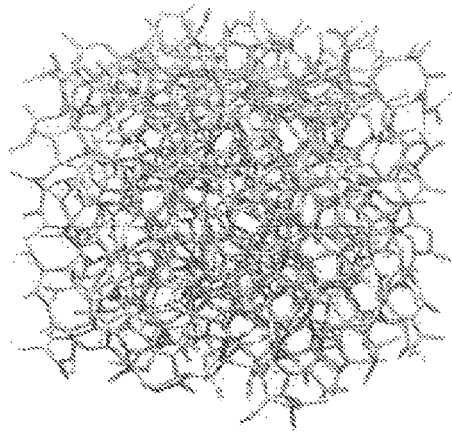
Figure 7b
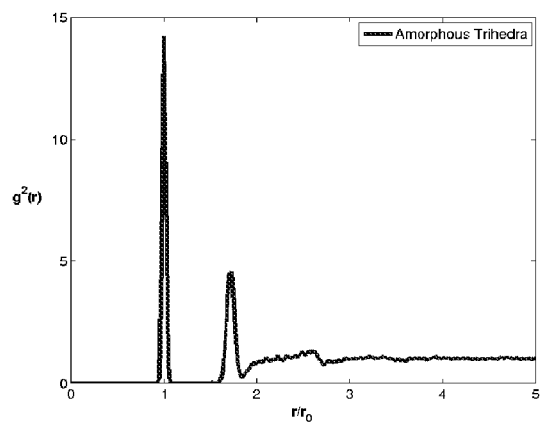
Figure 8
(a) (b)
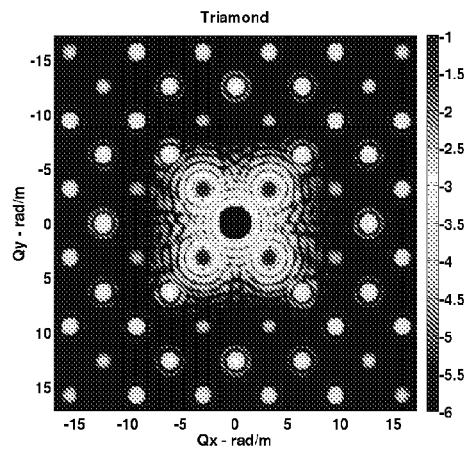 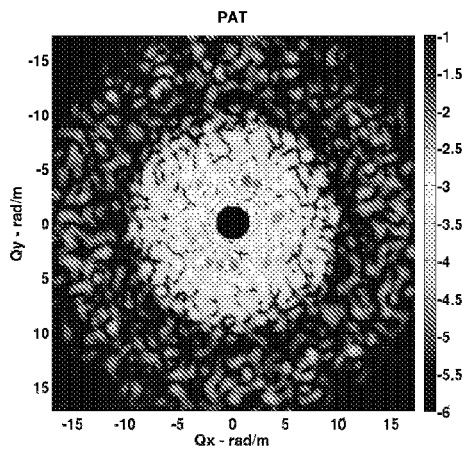

Figure 15
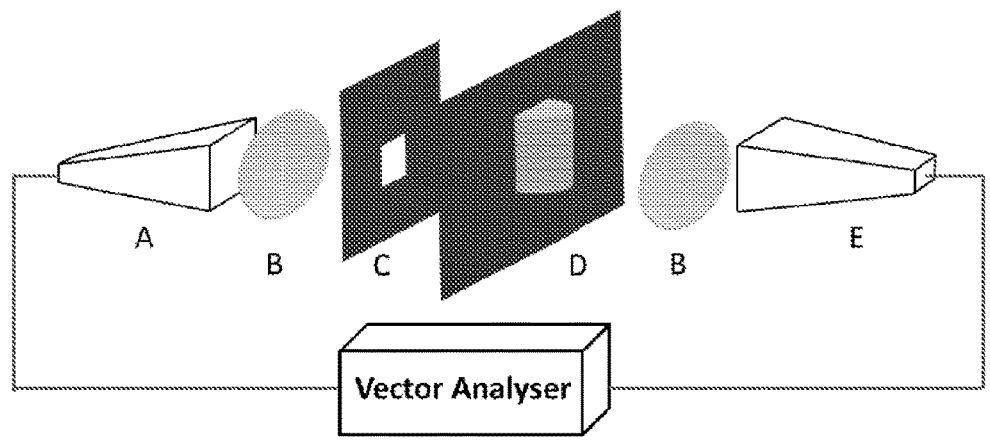
Figure 16
(a) 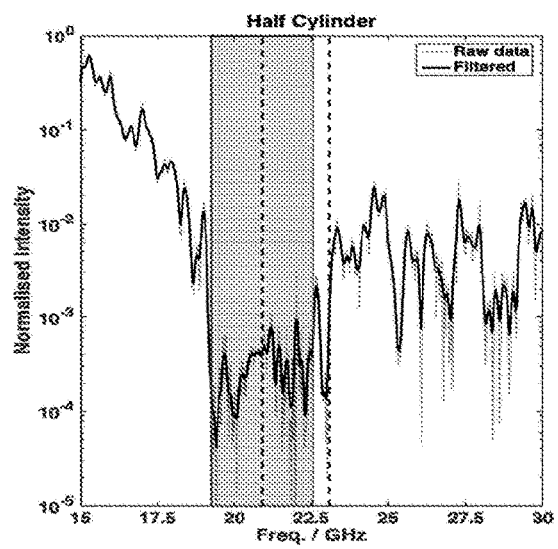 (b) 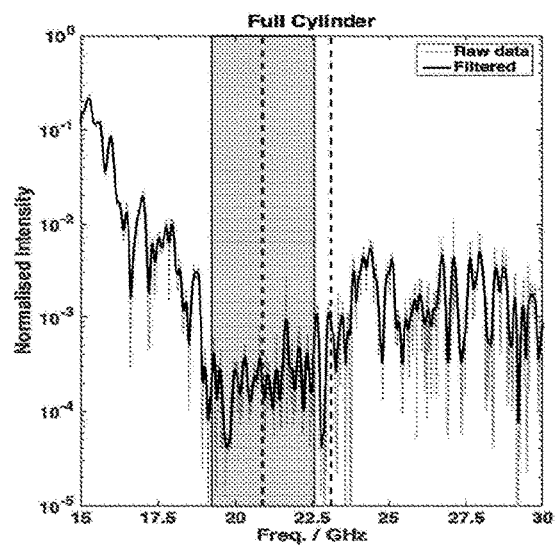

Figure 19A

| Width of complete photonic band gap / % | Size / N | LB90% Cross member length / % of mean | UB90% Cross member length / % of mean | LB90% Cross member angle / ° | UB90% Cross member angle / ° | LB90% dihedral angle / ° | UB90% dihedral angle / ° | LB90% Skew angle / ° | UB90% Skew angle / ° |
|---|---|---|---|---|---|---|---|---|---|
| 3.8 | 216 | 91.2 | 101.8 | 108 | 130 | 91 | 166 | 70 | 110 |
| 7.1 | 216 | 87.4 | 102.8 | 100 | 138 | 94 | 150 | 85 | 95 |
| 10.3 | 216 | 90.9 | 104.7 | 101 | 137 | 93 | 145 | 85 | 94 |
| 12.6 | 216 | 89.2 | 104.8 | 102 | 136 | 93 | 142 | 85 | 94 |
| 15.0 | 216 | 91.4 | 103.9 | 105 | 134 | 93 | 137 | 86 | 94 |
| 16.6 | 216 | 91.4 | 102.9 | 107 | 132 | 93 | 136 | 86 | 93 |
| 17.9 | 216 | 92.2 | 102.8 | 106 | 132 | 93 | 136 | 86 | 93 |
| 18.5 | 216 | 92.0 | 103.5 | 107 | 131 | 92 | 135 | 87 | 93 |
| 20.1 | 216 | 92.2 | 103.3 | 108 | 131 | 93 | 134 | 86 | 93 |

Figure 19B

| Width of complete photonic band gap / % | Size / N | LB90% Cross member length / % of mean | UB90% Cross member length / % of mean | LB90% Cross member angle / ° | UB90% Cross member angle / ° | LB90% dihedral angle / ° | UB90% dihedral angle / ° | LB90% Skew angle / ° | UB90% Skew angle / ° |
|---|---|---|---|---|---|---|---|---|---|
| 17.0 | 1000 | 93.7 | 105.9 | 105 | 133 | 93 | 134 | 86 | 94 |

COMPOSITION COMPRISING A THREE-DIMENSIONAL AMORPHOUS TRIVALENT NETWORK

The present invention relates to compositions, and in particular to compositions comprising a trivalent network. More specifically, the present invention relates to compositions comprising amorphous trivalent networks which may comprise a structural colouration material and/or a band gap material. The present disclosure also extends to use of the composition as a structural colouration material and a paint, dye or fabric comprising the structural colouration material. Additionally, the present disclosure extends to use of the composition as an optical filter or as a supporting matrix configured to define at least one optical component, such as a frequency filter, a light-guiding structure for a telecommunications application, an optical computer chip, an optical micro-circuit or a laser comprising the supporting matrix.

The Maxwell equations form the core of the classical theory of electromagnetism. They constitute a set of partial differential equations that describe the electric and magnetic fields and how they interact. Solving the Maxwell equations for a particular medium or structure tells you all the possible electric and magnetic fields that such a structure can support. Importantly, the Maxwell equations are scale-independent. Accordingly, they govern the behaviour of electric and magnetic fields at all known length scales.

A photonic band gap (PBG) material possesses structure within which the Maxwell equations possess no solutions that allow the propagation of light for a certain range of frequencies, say $\omega_c \pm \Delta \omega$. Light within this frequency range incident on a complete PBG structure cannot propagate through it, and is instead completely reflected. Accordingly, PBG materials are able to control and manipulate light flow.

PBG-like materials occur as colour-producing structures in nature, such as in the spines of the sea mouse, shell scales of the *Entimus imperialis* weevil and wing scales of the Green Hairstreak butterfly. Such structures possess a photonic pseudo-gap, sufficient to create colouration, and would exhibit a PBG if made from high refractive index material.

One dimensional PBG materials are used commercially in the form of thin-film optics, with applications from low and high reflection coatings on lenses and mirrors to colour changing paints and inks. Additionally, two dimensional PBG materials are available in the form of photonic-crystal fibres, which can be used as waveguides.

Many designs exist for complete, or three dimensional, PBG materials based on crystalline configurations, for example—the diamond network, the honeycomb network, the triangular lattice and Yablonovite. However, achievement of the design objectives in a disordered system is a more challenging process, particularly as the dimensionality of the system is increased.

Of all known complete band gap structures in three dimensions, one is disordered (photonic amorphous diamond (PAD) (Edagawa, 2008)); this illustrates the challenges that must be overcome by a successful design. Further, this design was achieved by accident; the photonic amorphous diamond network was in fact produced as a structural model of amorphous silicon.

It would be advantageous to be able to manufacture further PBG materials.

Accordingly, the present invention arises from the inventors work in trying to overcome the problems associated with the prior art.

In accordance with a first aspect of the invention, there is provided a composition comprising a three-dimensional amorphous trivalent network which reduces the number of modes within a particular frequency range ($\omega_c \pm \Delta \omega$).

Advantageously, the composition of matter of the first aspect is a novel material, which reduces the number of modes within a particular frequency range.

A mode of a field within a structure may be understood to describe the direction and magnitude of the field within that structure. A mode may have well-defined frequency $\omega$ and may not be considered a true mode unless this single frequency criterion is met.

Electromagnetic modes may be found by solving the Maxwell equations. The overall response of a structure to light is determined by the light's interaction with all the modes that the structure can support. Technically, modes are the solution to the Maxwell equations when considered as an eigenvalue problem. The operation of an appropriate field operator T on the electric (or magnetic) fields must reproduce that field multiplied by some constant value that is unique to that particular mode. For example, each solution to the following equation would constitute a mode of the magnetic field H:

$$\hat{\tau}_H H = \frac{\omega^2}{c^2} H \tag{1}$$

From this we can see the origin of the 'single frequency criterion' that a mode must have a characteristic frequency co.

It may be appreciated that the term "network" can define a connected network comprising a plurality of vertices which are interconnected by cross members. Accordingly, each cross member directly connects two vertices.

It may be appreciated that a network can be defined as "amorphous" when the network has no translational symmetry, i.e. it is not possible to define some fundamental repeating unit from which the network can be built.

An amorphous network may possess an average spherical or circular symmetry in the structure's diffraction pattern.

Additionally, an amorphous network may possess a normalised radial distribution function ($g^2(r)$) that possesses discrete peaks for small radii, and tends to a value of one as the radius tends to infinity.

Accordingly, a network may be considered to be amorphous if the normalised radial distribution function is between 0.8 and 1.2 when the normalised radius ($r/r_o$) is greater than 20, more preferably greater than 10, 9, 8, 7 or most preferably greater than 5 or 4.

It may be appreciated that the properties of an amorphous network of the composition when measured, may be insensitive to sample orientation. Accordingly, an amorphous network may possess isotropic physical properties—for example tensile strength or reflectance.

It may be appreciated that the network is defined as "trivalent" when at least 60% of the vertices within the network are directly connected to exactly three distinguishable vertices. Preferably, at least 70%, 80% or 90% of the vertices within the network are directly connected to exactly three distinguishable vertices. More preferably, at least 95%, 96%, 97%, 98% or 99% of the vertices within the network are directly connected to exactly three distinguishable vertices. Most preferably, substantially all of the vertices within the network are directly connected to exactly three distinguishable vertices.

Accordingly, the trivalent network may be considered to comprise a plurality of trihedra, wherein each trihedron comprises a central vertex which is directly connected to three outer vertices. One embodiment of a trihedron is shown in FIG. 3a, while a trivial trivalent network is illustrated in FIG. 3b.

Preferably, the amorphous trivalent network defines a band gap.

It may be appreciated that the term "band gap" can be a frequency window, defined as $\omega_c \pm \Delta\omega$, within which a structure or medium possesses no modes of the field. This means that a wave having a frequency within this window cannot pass through the material.

Preferably, the amorphous trivalent network of the composition defines a photonic band gap (PBG).

Advantageously, the amorphous trivalent network can prevent electromagnetic waves within a given frequency range from passing therethrough. Accordingly, the amorphous trivalent network may be used to design advanced optical components for next-generation optical processing.

Preferably, the band gap is a one dimensional band gap. More preferably, the band gap is a two dimensional band gap. Most preferably, the band gap is a complete, or three dimensional, band gap.

It may be appreciated that the term "complete band gap" can define a band gap that exists for all possible directions that light may travel within the structure or medium.

Preferably, the band gap has a width of at least 1%. More preferably, the band gap has a width of at least 5%, 10% or 15%. Most preferably, the band gap has a width of at least 16%, 17%, 18%, 19%, or 20%.

It may be appreciated that the width of a band gap can be a measure of the width of the frequency window within which the band gap exists. Given the scale invariant properties of the Maxwell equations, the band gap is defined above as a dimensionless measure of the width. The width is thus the gap's absolute frequency width ($\Delta\omega$) divided by a central frequency ($\omega_c$) of the gap and then expressed as a percentage:

$$\text{Width} = \left(100 \times \frac{\Delta\omega}{\omega_c}\right)\% \quad (2)$$

In one embodiment, the central frequency is between 430 THz and 770 THz.

Advantageously, electromagnetic radiation in this range is visible and the composition could be used in a structural colouration application.

In an alternative embodiment, the central frequency is between 50 THz and 400 THz, preferably between 100 THz and 300 THz, most preferably between 150 THz and 250 THz.

Advantageously, the composition could be used in applications in information processing and telecommunications.

In a further alternative embodiment, the central frequency is between 1 and 100 GHz, preferably between 5 and 50 GHz or 10 and 40 GHz, and most preferably between 18-27 GHz.

Advantageously, the composition could be used in applications in the processing of optical signals in the microwave K-Band.

Each cross member may define a length. Cross member lengths within the network of the composition of the first aspect may comprise a distribution about a mean cross member length.

It may be appreciated that the cross member length may be defined as the spatial distance between the two vertices within the composition that are directly connected by the cross member.

Preferably, at least 90% of the cross members within the network of the composition define a length between 70% and 130% of the mean cross member length, or between 80% and 120% of the mean cross member length. More preferably, at least 90% of the cross members within the network define a length between 85% and 115% of the mean cross member length, or between 90.5% and 107.8% of the mean cross member length. Most preferably, at least 90% of the cross members within the network define a length between 93.4% and 105.6% of the mean cross member length.

Preferably, at least 80% of the cross members within the network of the composition define a length between 80% and 120% of the mean cross member length, or between 85% and 115% of the mean cross member length. More preferably, at least 80% of the cross members within the network define a length between 90% and 110% of the mean cross member length, or between 92.8% and 106.2% of the mean cross member length. Most preferably, at least 80% of the cross members within the network define a length between 94.9% and 104.3% of the mean cross member length.

Preferably, at least 70% of the cross members within the network of the composition define a length between 85% and 115% of the mean cross member length, or between 90% and 110% of the mean cross member length. More preferably, at least 70% of the cross members within the network define a length between 92.5% and 107.5% of the mean cross member length, or between 94.2% and 105.2% of the mean cross member length. Most preferably, at least 70% of the cross members within the network define a length between 95.8% and 103.4% of the mean cross member length.

The cross members may have a substantially circular cross-section. Accordingly, each cross member may be substantially cylindrical.

The width of the cross members within the network of the composition of the first aspect may be constant. However, the cross member width should compliment the cross member length.

It will be appreciated that the cross member width deemed to compliment the cross member length will depend on, the nature of the application, the frequency of the application and the refractive index of the composition. For instance, for lower refractive indexes the composition preferably comprises wider cross members.

Conversely, for higher refractive indexes the composition preferably comprises thinner cross members.

Accordingly, in one embodiment, the cross member width within the network of the composition may be between 60% and 120% of the mean cross member length.

Preferably, the cross member width is between 70% and 110%, or between 80% and 100% of the mean cross member length. Most preferably, the cross member width is between 85% and 95% of the mean cross member length.

A cross member width which is between 85% and 95% of the mean cross member length is particularly advantageous in compositions with a refractive index of about 3.1.

Cross member angles within the network of the composition may comprise a distribution about a mean cross member angle.

It may be appreciated that the term "cross member angle" can define the angle between two cross members which extend from a common vertex.

The mean cross member angle within the network of the composition may be between 110° and 130°, more preferably between 112° and 125°, and even more preferably between 115° and 122°.

Preferably, at least 90% of the cross member angles within the network define an angle between 80° and 160°, or between 90° and 150°. More preferably, at least 90% of the cross member angles within the network define an angle between 95° and 145°, or between 99° and 138°. Most preferably, at least 90% of the cross member angles within the network define an angle between 105° and 134°.

Preferably, at least 80% of the cross member angles within the network define an angle between 85° and 155°, or between 95° and 145°. More preferably, at least 80% of the cross member angles within the network define an angle between 100° and 140°, or between 103° and 134°. Most preferably, at least 80% of the cross member angles within the network define an angle between 108° and 130°.

Preferably, at least 70% of the cross member angles within the network define an angle between 90° and 150°, or between 100° and 140°. More preferably, at least 70% of the cross member angles within the network define an angle between 105° and 135°, or between 106° and 130°. Most preferably, at least 70% of the cross member angles within the network define an angle between 110° and 128°.

Skew angles within the network of the composition may comprise a distribution about a mean skew angle.

As explained above, the trivalent network may be considered to comprise a plurality of trihedra. It may be appreciated that the "skew angle" may be a measure of how co-planar the four vertices within a given trihedra are. Accordingly, the skew angle can be defined as the angle between the normal of a plane, comprising the central vertex of the trihedron and two of the other vertices, and between the cross member between the central vertex and the remaining vertex in the tihedron which does not form the plane. Accordingly, a tihedron has three measurable skew angles. If the tihedron is perfectly planar all of the skew angles will be 90°.

The mean skew angle may be between 80° and 100°, more preferably between 85° and 95°, and even more preferably between 88° and 92°. Most preferably, the mean skew angle is about 90°.

Preferably, at least 90% of the skew angles within the network define an angle between 70° and 110°, or between 75° and 105°. More preferably, at least 90% of the skew angles within the network define an angle between 80° and 100°, or between 85° and 94°. Most preferably, at least 90% of the skew angles within the network define an angle between 86° and 93°.

Preferably, at least 80% of the skew angles within the network define an angle between 75° and 105°, or between 80° and 100°. More preferably, at least 80% of the skew angles within the network define an angle between 82.5° and 97.5°, or between 86° and 93°. Most preferably, at least 80% of the skew angles within the network define an angle between 87° and 93°.

Preferably, at least 70% of the skew angles within the network define an angle between 80° and 100°, or between 82.5° and 97.5°. More preferably, at least 70% of the skew angles within the network define an angle between 85° and 95°, or between 87° and 93°. Most preferably, at least 70% of the skew angles within the network define an angle between 88° and 92°.

Dihedral angles within the network of the invention may comprise a distribution about a mean dihedral angle.

As explained above, the trivalent network may be considered to comprise a plurality of trihedra. Accordingly, two trihedra may comprise one shared cross member and two shared vertices, i.e. the central vertex of the first trihedron is directly connected to the central vertex of second trihedron. This configuration is shown in FIG. 3b. The first trihedron may define a first plane which comprises the central vertex of the first trihedron and the two vertices which do not comprise the second trihedron. Similarly, the second trihedron may define a second plane which is formed by the central vertex of the second trihedron and the two vertices which do not comprise the first trihedron. It may be appreciated that the "dihedral angle" can be the angle between the normal to the first plane and the normal to the second plane.

It will be appreciated that unless the dihedral angle is 90°, it can have two values. Accordingly, if a measurement of x° is taken for the dihedral angle, it could also be expressed as (180−x)°. The dihedral angle as herein defined is the angle between the normal to the first plane and the normal to the second plane which is greater than or equal to 90°.

The mean dihedral angle may be between 100° and 120°, more preferably between 105° and 115°, and even more preferably between 107° and 112°. Most preferably, the mean skew angle is about 109.47°.

Preferably, at least 90% of the dihedral angles within the network define an angle between 92° and 155°, or between 93° and 149°. More preferably, at least 90% of the dihedral angles within the network define an angle between 93° and 133°.

Preferably, at least 80% of the dihedral angles within the network define an angle between 95° and 145°, or between 96° and 137°. More preferably, at least 80% of the dihedral angles within the network define an angle between 96° and 127°.

Preferably, at least 70% of the dihedral angles within the network define an angle between 95° and 140°, or between 98° and 130°. More preferably, at least 70% of the dihedral angles within the network define an angle between 97° and 123°.

Accordingly, the cross member lengths within the network of the composition of the invention may comprise a distribution about a mean cross member length, and the cross member angles within the network may comprise a distribution about a mean cross member angle. The skew angles within the network may comprise a distribution about a mean skew angle and dihedral angles within the network may comprise a distribution about a mean dihedral angle. The mean cross member length, mean cross member angle, mean skew angle and mean dihedral angle may be as defined above. The distribution about the mean cross member length, mean cross member angle, mean skew angle and mean dihedral angle may be as defined above.

Preferably, the width of the cross members is constant. The width of the cross members may be as defined above.

In one preferred embodiment, the composition of the invention comprises an amorphous trivalent network which defines a band gap in which at least 90% of the cross members within the network define a length between 90.5% and 107.8% of the mean cross member length, at least 90% of the cross member angles within the network define an angle between 99° and 138°, at least 90% of the skew angles within the network define an angle between 85° and 94°, and at least 90% of the dihedral angles within the network define an angle between 93° and 149°.

In another preferred embodiment, the composition of the invention comprises an amorphous trivalent network which defines a band gap in which at least 80% of the cross members within the network define a length between 92.8% and 106.2% of the mean cross member length, at least 80% of the cross member angles within the network define an angle between 103° and 134°, at least 80% of the skew angles within the network define an angle between 86° and 93°, and at least 80% of the dihedral angles within the network define an angle between 96° and 137°.

In a preferred embodiment, the composition of the invention comprises an amorphous trivalent network which defines a band gap in which at least 70% of the cross members within the network define a length between 94.2% and 105.2% of the mean cross member length, at least 70% of the cross member angles within the network define an angle between 106° and 130°, at least 70% of the skew angles within the network define an angle between 87° and 93°, and at least 70% of the dihedral angles within the network define an angle between 97° and 130°.

In a most preferred embodiment, the composition of the invention comprises an amorphous trivalent network which defines a band gap in which at least 90% of the cross members within the network define a length between 93.4% and 105.6% of the mean cross member length, at least 90% of the cross member angles within the network define an angle between 105° and 134°, at least 90% of the cross member angles within the network define an angle between 86° and 93°, at least 90% of the skew angles within the network define an angle between 86° and 93°, and at least 90% of the dihedral angles within the network define an angle between 93° and 133°.

In a most preferred embodiment, the composition of the invention comprises an amorphous trivalent network which defines a band gap in which at least 80% of the cross members within the network define a length between 94.9% and 104.3% of the mean cross member length, at least 80% of the cross member angles within the network define an angle between 108° and 130°, at least 80% of the skew angles within the network define an angle between 87° and 93°, and at least 80% of the dihedral angles within the network define an angle between 96° and 127°.

In a most preferred embodiment, the composition of the invention comprises an amorphous trivalent network which defines a band gap in which at least 70% of the cross members within the network define a length between 95.8% and 103.4% of the mean cross member length, at least 70% of the cross member angles within the network define an angle between 110° and 128°, at least 70% of the skew angles within the network define an angle between 88° and 92°, and at least 70% of the dihedral angles within the network define an angle between 97° and 123°.

Alternatively, the amorphous trivalent network of the composition reduces the number of electromagnetic modes within a particular frequency range ($\omega_c \pm \Delta\omega$).

Accordingly, a mode of a field within a structure may be understood to describe the direction and magnitude of the electric and magnetic fields within that structure. A mode may have well-defined frequency ω and may not be considered a true mode unless this single frequency criterion is met.

Accordingly, a density of states within the amorphous trivalent network within the particular frequency range may be at least 10% less than in a homogenous material with a refractive index equal to a volume averaged refractive index of the amorphous trivalent network.

It will be appreciated that the volume averaged refractive index n of the amorphous trivalent network may be written as:

$$\bar{n} = fn + (1-f)n_0$$

wherein n is the refractive index of a material comprising the amorphous trivalent network, $n_o$ is the refractive index of a background material disposed within the amorphous trivalent network, and f is a fraction of a volume of the material comprising the amorphous trivalent network compared to a total volume of the material comprising the amorphous trivalent network and the background material.

Preferably, the density of states within the amorphous trivalent network within the particular frequency range is at least 20%, 30%, 40% or 50% less than in a homogenous material with a refractive index equal to a volume averaged refractive index of the amorphous trivalent network, and more preferably, at least 60%, 70% or 80% less than in a homogenous material with a refractive index equal to a volume averaged refractive index of the amorphous trivalent network.

Advantageously, since the amorphous trivalent network prevents and reduces certain bandwidths of light passing therethrough the amorphous trivalent network could be used to produce fade-proof colouration for fabrics and paints.

Preferably, the amorphous trivalent network of the composition reduces the number of frequency modes in one dimension. More preferably, the amorphous trivalent network of the composition reduces the number of frequency modes in two dimensions. Most preferably, the amorphous trivalent network of the composition reduces the number of frequency modes in three dimensions.

Preferably, the frequency over which the composition reduces the number of frequency modes has a width of at least 1%. More preferably, the frequency over which the composition reduces the number of frequency modes has a width of at least 5%, 10% or 15%. Most preferably, the frequency over which the composition reduces the number of frequency modes has a width of at least 16%, 17%, 18%, 19%, or 20%.

Preferably, the central frequency is between 430 THz and 770 THz.

Advantageously, electromagnetic radiation in this range is visible and the composition could be used in a structural colouration application.

Cross member lengths within the network of the composition of the first aspect may comprise a distribution about a mean cross member length.

Preferably, at least 90% of the cross members within the network of the composition define a length between 85% and 115% of the mean cross member length, more preferably between 90% and 110% of the mean cross member length, and most preferably between 96.3% and 103.2% of the mean cross member length.

Preferably, at least 80% of the cross members within the network of the composition define a length between 90% and 110% of the mean cross member length, more preferably between 95% and 105% of the mean cross member length, and most preferably between 97.1% and 102.5% of the mean cross member length.

Preferably, at least 70% of the cross members within the network of the composition define a length between 92.5% and 107.5% of the mean cross member length, more preferably between 95.5% and 104% of the mean cross member length, and most preferably between 97.6% and 102.0% of the mean cross member length.

The cross members may have a substantially circular cross-section. Accordingly, each cross member may be substantially cylindrical.

Accordingly, the cross member width within the network of the composition may be between 60% and 120% of the mean cross member length. Preferably, the cross member width is between 70% and 110%, or between 80% and 100% of the mean cross member length. Most preferably, the cross member width is between 85% and 95% of the mean cross member length.

The mean cross member angle within the network of the composition may be between 110° and 130°, more preferably between 112° and 125°, and even more preferably between 115° and 122°.

Preferably, at least 90% of the cross member angles within the network define an angle between 95° and 140°, more preferably between 105° and 130°, and most preferably between 111° and 124°.

Preferably, at least 80% of the cross member angles within the network define an angle between 100° and 135°, more preferably between 107.5° and 127.5°, and most preferably between 112° and 123°.

Preferably, at least 70% of the cross member angles within the network define an angle between 105° and 130°, more preferably between 110° and 125°, and most preferably between 113° and 122°.

The mean skew angle may be between 80° and 100°, more preferably between 85° and 95°, and even more preferably between 88° and 92°. Most preferably, the mean skew angle is about 90°.

Preferably, at least 90% of the skew angles within the network define an angle between 35° and 135°, more preferably between 40° and 130°, and most preferably between 47° and 126°.

Preferably, at least 80% of the skew angles within the network define an angle between 40° and 130°, more preferably between 45° and 125°, and most preferably between 52° and 121°.

Preferably, at least 70% of the skew angles within the network define an angle between 45° and 127.5°, more preferably between 50° and 122.5°, and most preferably between 57° and 117°.

The mean dihedral angle may be between 100° and 120°, more preferably between 105° and 115°, and even more preferably between 107° and 112°. Most preferably, the mean skew angle is about 109.470.

Preferably, at least 90% of the dihedral angles within the network define an angle between 90° and 170°, more preferably between 90° and 165°, and most preferably between 90° and 158°.

Preferably, at least 80% of the dihedral angles within the network define an angle between 91 and 160°, more preferably between 92° and 155°, and most preferably between 93° and 150°.

Preferably, at least 70% of the dihedral angles within the network define an angle between 93° and 155°, more preferably between 94° and 150°, and most preferably between 95° and 144°.

Preferably, the width of the cross members is constant.

In one preferred embodiment, the composition of the invention comprises an amorphous trivalent network which reduces the number of modes within a particular frequency range ($\omega_c \pm \Delta\omega$) in which at least 90% of the cross members within the network define a length between 96.3% and 103.2% of the mean cross member length, at least 90% of the cross member angles within the network define an angle between 111° and 124°, at least 90% of the skew angles within the network define an angle between 47° and 126°, and at least 90% of the dihedral angles within the network define an angle between 90° and 158°.

In another preferred embodiment, the composition of the invention comprises an amorphous trivalent network which reduces the number of modes within a particular frequency range ($\omega_c \pm \Delta\omega$) in which at least 80% of the cross members within the network define a length between 97.1% and 102.5% of the mean cross member length, at least 80% of the cross member angles within the network define an angle between 112° and 123°, at least 80% of the skew angles within the network define an angle between 52° and 121°, and at least 80% of the dihedral angles within the network define an angle between 93° and 150°.

In a preferred embodiment, the composition of the invention comprises an amorphous trivalent network which reduces the number of modes within a particular frequency range ($\omega_c \pm \Delta\omega$) in which at least 70% of the cross members within the network define a length between 97.6% and 102.0% of the mean cross member length, at least 70% of the cross member angles within the network define an angle between 113° and 122°, at least 70% of the skew angles within the network define an angle between 57° and 117°, and at least 70% of the dihedral angles within the network define an angle between 95° and 144°.

As explained above, the composition of the first aspect can be used as an effective structural colouration material.

Accordingly, in a second aspect of the invention, there is provided use of the composition of the first aspect as a structural colouration material.

In a third aspect, there is provided a structural colouration material comprising the composition of the first aspect.

The term "structural coloration material" may refer to a material that produces colouring as a result of its structure rather than the presence of pigments. The structural coloration material may be configured to selectively reflect wavelengths of light corresponding to certain colours and transmit the other visible wavelengths of light. Accordingly, the wavelengths of light that are reflected would be perceived to be the colour of the material.

Advantageously, the structural colouration material is substantially fade proof.

Accordingly, the central frequency may be between 430 THz and 770 THz.

The composition having the amorphous trivalent network may comprise a material with a predominantly real and relatively small refractive index.

It may be understand that the relative dielectric permittivity ($\varepsilon_r$) is the square of the refractive index.

Accordingly, the amorphous trivalent network of the composition may have a relative dielectric permittivity ($\varepsilon_r$) of between 1 and 15 at frequencies of between 0.5 GHz and 2,000,000 GHz.

In one embodiment, the amorphous trivalent network of the composition may have a relative dielectric permittivity ($\varepsilon_r$) of between 1.5 and 10 at frequencies of between 0.5 GHz and 10 GHz. More preferably, the amorphous trivalent network may have a relative dielectric permittivity ($\varepsilon_r$) of between 2 and 5 at frequencies of between 1 GHz and 5 GHz.

Accordingly, the amorphous trivalent network may comprise a common polymer, such as nylon.

In an alternative embodiment, the amorphous trivalent network of the composition may have a relative dielectric permittivity ($\varepsilon_r$) of between 1 and 10 at frequencies of between 100 THz and 1,000 THz. More preferably, the amorphous trivalent network may have a relative dielectric permittivity ($\varepsilon_r$) of between 1.5 and 5 at frequencies of between 250 THz and 750 THz.

Accordingly, the amorphous trivalent network may comprise titania ($TiO_2$).

In a further alternative embodiment, the amorphous trivalent network of the composition may have a relative dielectric permittivity ($\varepsilon_r$) of between 1 and 15 at frequencies of between 250 THz and 2,000 THz. More preferably, the amorphous trivalent network may comprise a material with a relative dielectric permittivity ($\varepsilon_r$) of between 5 and 10 at frequencies of between 500 THz and 1750 THz.

Accordingly, the amorphous trivalent network may comprise silicon dioxide or quartz ($SiO_2$).

In accordance with a fourth aspect, there is provided a paint, dye or fabric comprising the structural colouration material of the third aspect.

The composition comprising the amorphous trivalent network can also be used as a supporting matrix within which optical components can be designed.

Hence, in a fifth aspect, there is provided use of the composition of the first aspect as a supporting matrix configured to define at least one optical component.

In accordance with an sixth aspect, there is provided a supporting matrix comprising the composition of the first aspect configured to define at least one optical component.

Preferably, the amorphous trivalent network of the composition is configured to define a photonic band gap (PBG).

The amorphous trivalent network of the composition may have a predominantly real and relatively large refractive index.

In one embodiment, the supporting matrix may be configured for use in the processing of optical signals for telecommunications.

Accordingly, the central frequency may be between 50 THz and 400 THz, preferably between 100 THz and 300 THz, most preferably between 150 THz and 250 THz.

Accordingly, the amorphous trivalent network may have a relative dielectric permittivity of between 2 and 100, at frequencies of between 145 THz and 375 THz. More preferably, the amorphous trivalent network may comprise a material with relative dielectric permittivity of between 9 and 50 at frequencies between 166 THz and 300 THz.

It will be appreciated that the amorphous trivalent network may comprise any material that comprises a relative dielectric permittivity as specified above. The relative permittivity of crystalline silicon is understood to lie between 11.97 and 12.37 over the frequency range from 167 THz to 250 THz (H. H. Li.). The relative permittivity of amorphous silicon is understood to lie between 11.83 and 12.74 over the frequency range from 145 THz to 265 THz (D. T. Pierce and W. E. Spicer). Accordingly, the amorphous trivalent network may comprise silicon. The silicon may comprise crystalline silicon or amorphous silicon.

In one embodiment, the supporting matrix may be configured for use in the processing of optical signals in the microwave K-Band.

Accordingly, the central frequency may be between 1 and 100 GHz, preferably between 5 and 50 GHz or 10 and 40 GHz, and most preferably between 18-27 GHz.

Advantageously, optical processing at microwave frequencies is of particular use in satellite communications and mobile telephony.

Accordingly, the amorphous trivalent network may have a relative dielectric permittivity of between 1 and 100, at frequencies of between 1 GHz and 500 GHz. More preferably, the amorphous trivalent network may comprise a material with relative dielectric permittivity of between 2 and 75 at frequencies between 5 GHz and 60 GHz. It will be appreciated that the amorphous trivalent network may comprise any material that comprises a relative dielectric permittivity as specified above. Accordingly, the amorphous trivalent network may comprise alumina ($Al_2O_3$) or zirconia ($ZrO_2$).

The at least one optical component may comprise a wave guide.

Advantageously, the amorphous trivalent material can support waveguides having arbitrary bending angles.

The at least one optical component may comprise a wave guide interconnection. The wave guide interconnection may comprise a "Y-" or "T-" shaped junction.

The at least one optical component may comprise a resonant cavity.

Preferably, the supporting matrix is configured to define a plurality of optical components. Preferably, each optical component is arranged so as to be in optical communication with another optical component.

Advantageously, the plurality of optical components can communication with one another to create a complex functionality.

Accordingly, the at least one optical component may comprise an interconnected wave guide and optical cavity.

The at least one optical component may comprise an optical filter.

The term "optical filter" may refer to an optical device that selects a spectral component from an optical signal containing a broadband combination of components. Such devices can be designed from specific arrangements of optical cavities and waveguides which are in optical communication with one another.

The optical filter may be a transmission filter, i.e. the selected component may be transmitted and remaining components may be reflected. Alternatively, the optical filter may be a reflection filter, i.e. the selected component may be reflected and remaining components may be transmitted.

In accordance with a seventh aspect, there is provided a frequency filter; a light-guiding structure for a telecommunications application; a light-guiding structure for a satellite communications and/or mobile telephone application; an optical computer chip; an optical micro-circuit; or a laser, each comprising the supporting matrix of the eighth aspect.

All features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying Figures, in which:—

FIG. 3a shows a trihedron in a simple planar shape consisting of a central vertex connected to three outer vertices; and FIG. 3b shows how two trihedra can be arranged to have a dihedral angle by 'twisting' them along their shared cross member;

FIG. 4 shows the simulation domain used for generating an amorphous triamond point pattern;

FIG. 7a is an illustration of a 1000-point a-trimene structure; and FIG. 7b is a graph showing the calculated radial distribution function of the 1000-point a-trimene structure of FIG. 7a;

FIG. 8 shows slices through the Qz=0 plane of the total scattering structure functions for (a) crystal triamond and (b) a-triamond, both structures have a volume fill fraction 30% and the central peaks have been masked out artificially;

FIG. 12b is a graph showing the calculated radial distribution function of the 1000-point a-triamond structure of FIG. 12a;

Figure 17:
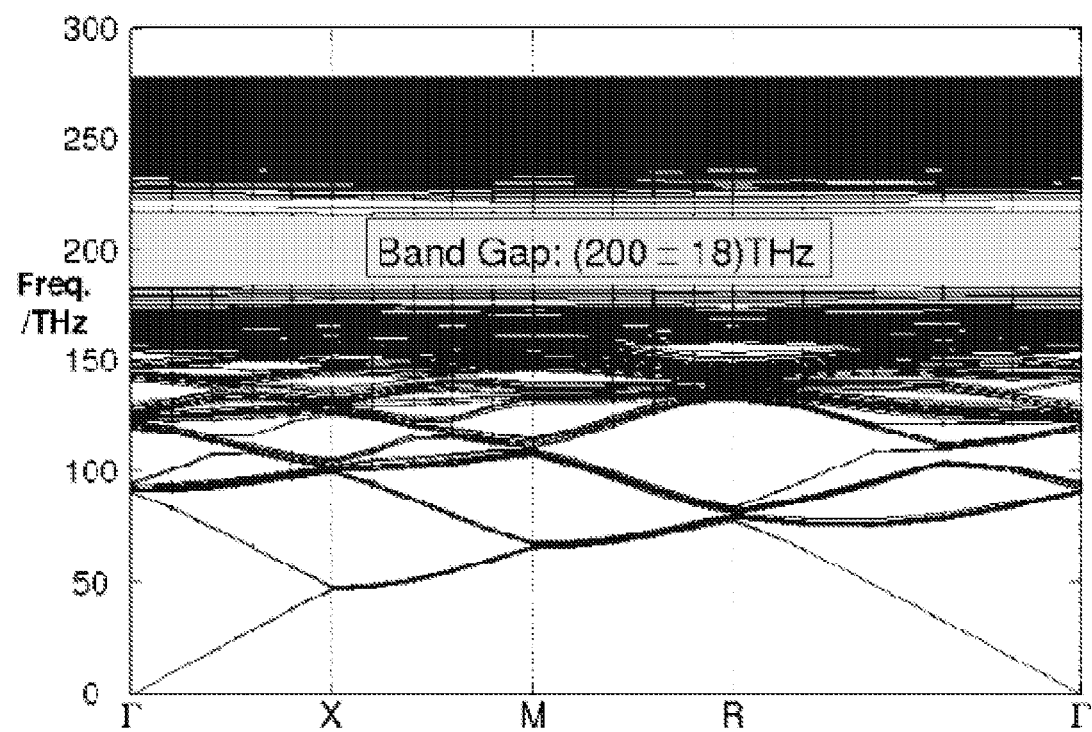
Figure 18:
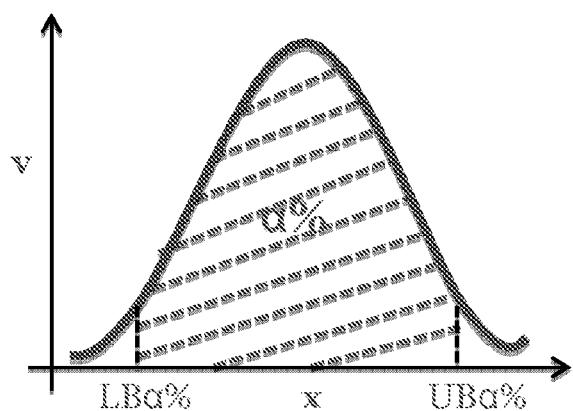
Figure 20:
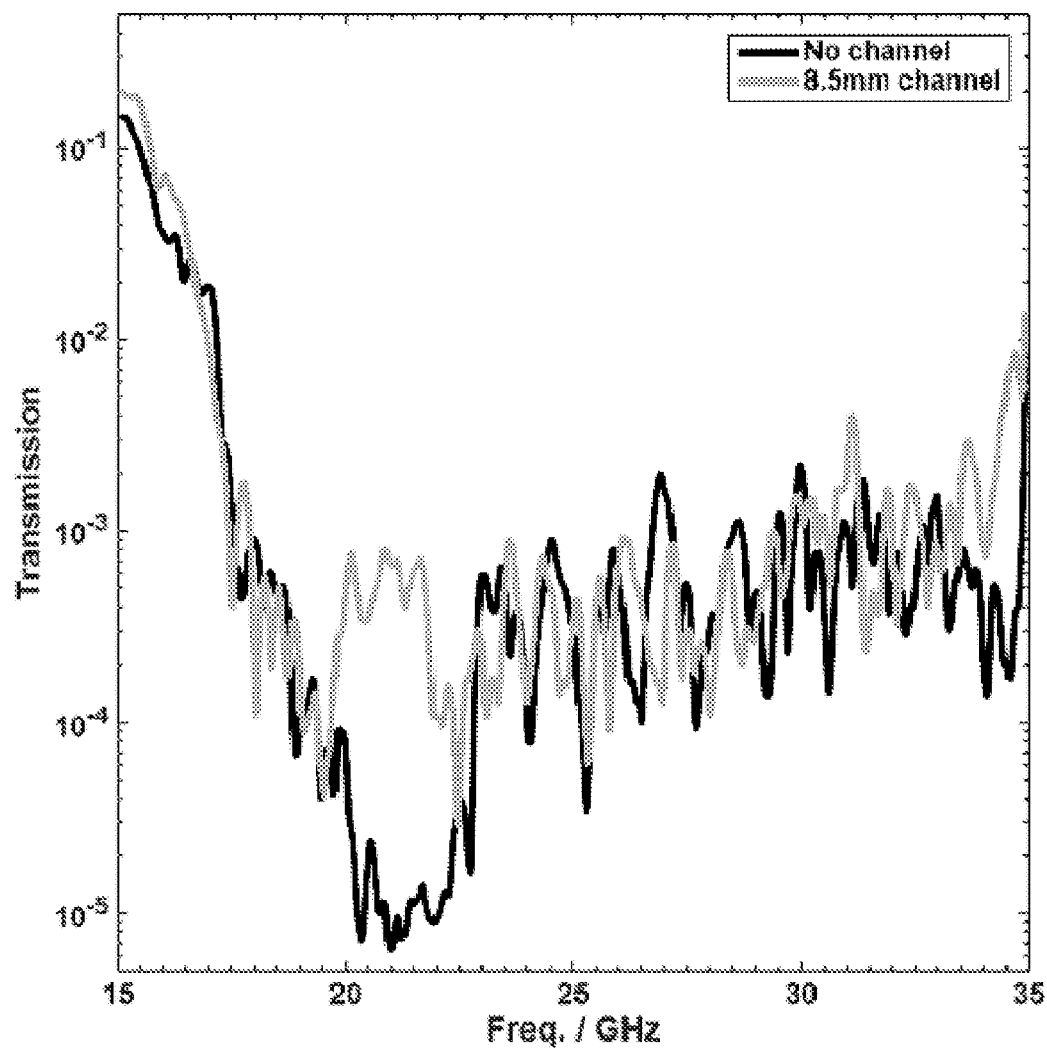
Figure 21:
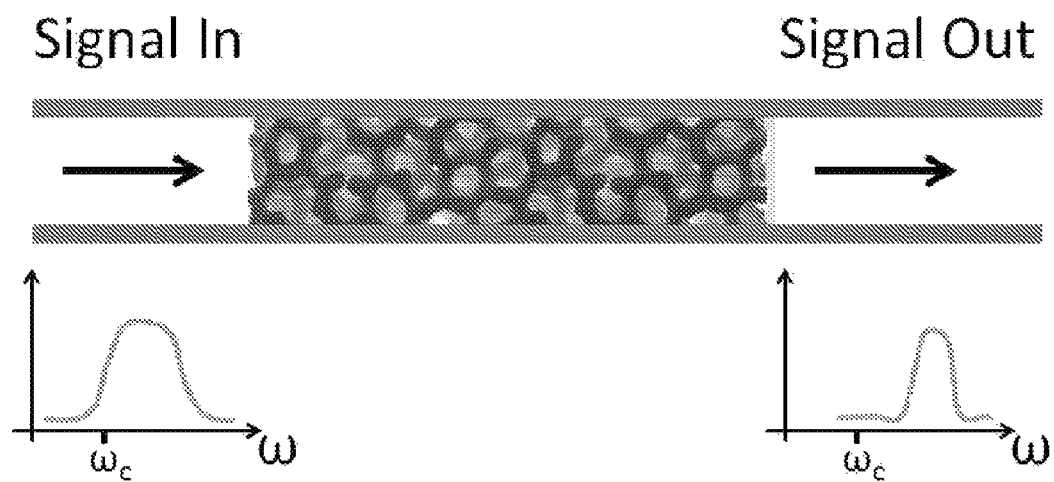
Figure 22:
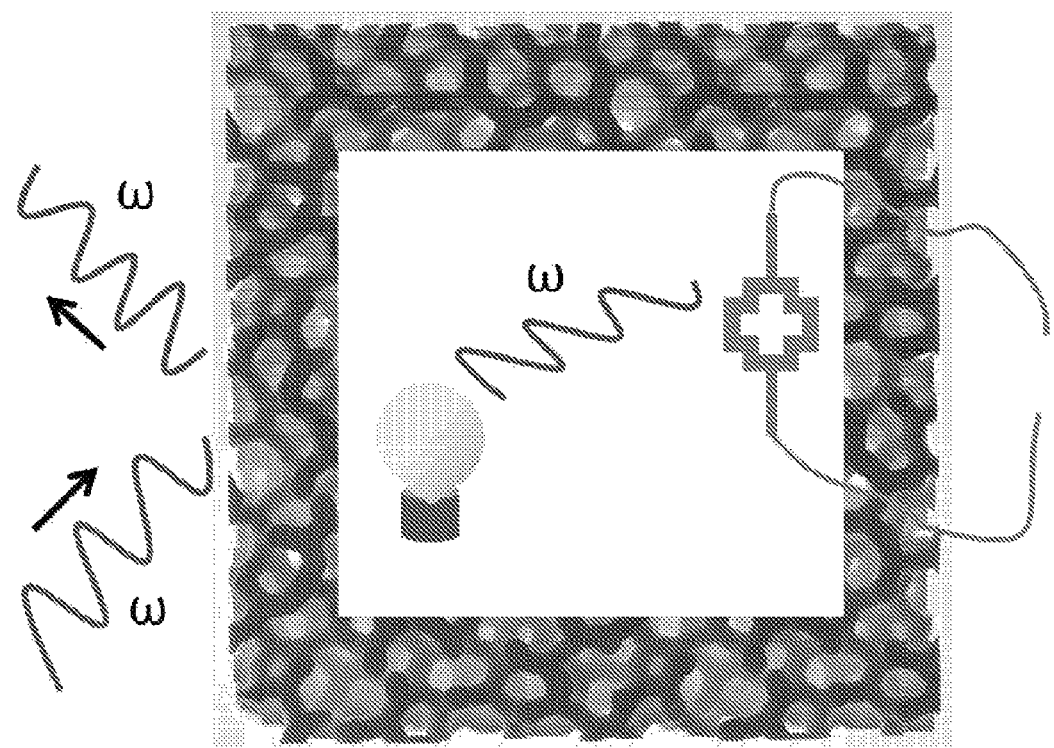
Figure 23:
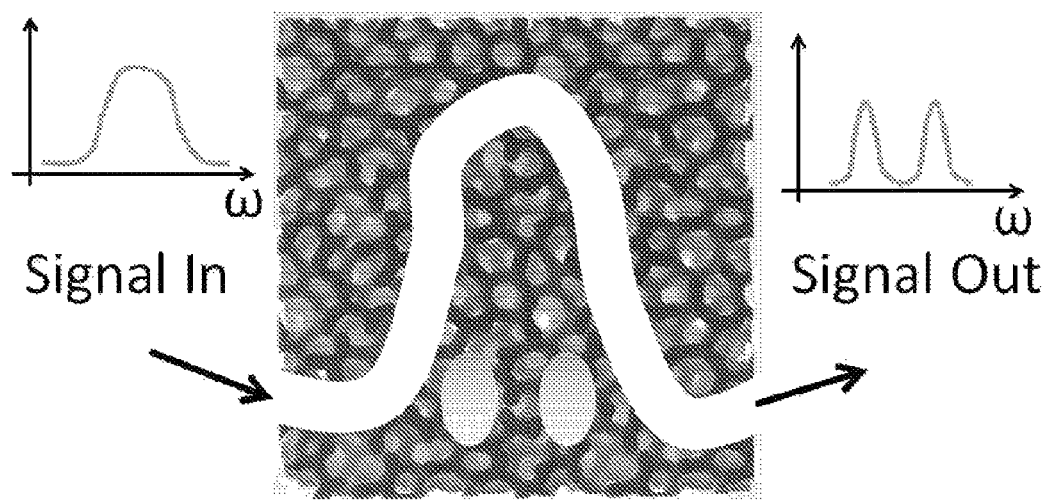
Figure 24:
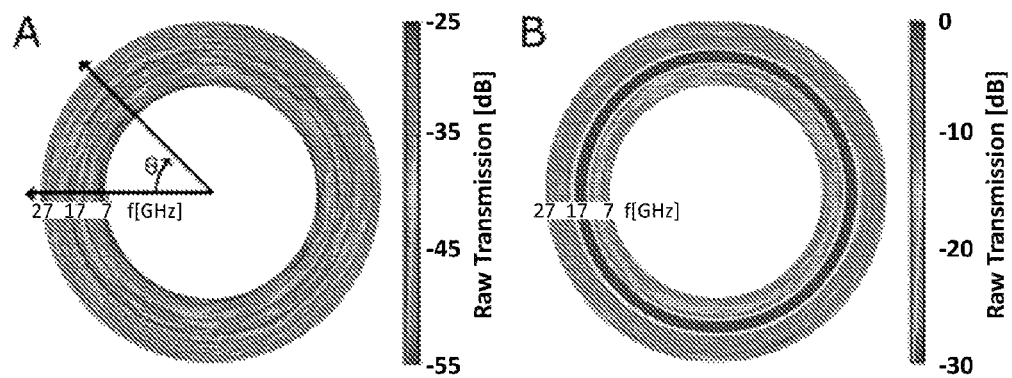

FIG. 14 shows an a-triamond cylindrical model 3D-printed in aluminium oxide ceramic in accordance with one embodiment of the invention; FIG. 14a shows how the model was printed as two half cylinders; FIG. 14b shows how these could be assembled to form a single complete cylinder; FIG. 14c shows a side view of a half cylinder; and FIG. 14d shows a top plan view of the half cylinder;

FIG. 15 is a schematic illustration of an experimental apparatus for measuring the transmission spectrum of the cylindrical model of FIG. 14;

FIG. 16 shows the transmission spectra for the range 15-30 GHz for (a) a single half-cylinder of a-triamond and (b) the complete cylinder of a-triamond;

FIG. 17 shows a photonic band structure of an a-triamond 216-point network for a refractive index of 13, scaled such that the central frequency of the photon band gap (PBG) corresponds to the 1.5 μm telecommunications wavelength;

FIG. 18 is a graph showing how a range of values may be quantified;

FIG. 19A is a table showing the complete photonic bang gap for a range of a-triamond samples with 216 vertices; and FIG. 19B is a table showing the complete photonic bang gap for an a-triamond sample with 1000 vertices;

FIG. 20 shows how the transmission spectra for the range 15-30 GHz for the complete cylinder of a-triamond varies when the structure comprises a channel;

FIG. 21 is a schematic illustration of an optical filter;

FIG. 22 is a schematic illustration of an optical insulator;

FIG. 23 is a schematic illustration of an optical component comprising a waveguide and two resonant cavities; and FIG. 24 shows polar heat maps depicting the transmission spectra for (a) a set of incident angles by rotating the complete cylinder of a-triamond; and (b) finite-difference time-domain (FDTD) simulation.

EXAMPLE 1: AMORPHOUS MATERIAL SIMULATION

Background

Interest in amorphous materials can be traced back to Zachariesen's 1932 paper (Zachariasen, 1932). He sought to understand the structure of $SiO_2$ and other vitreous oxides, collectively dubbed glasses. Currently, glasses are considered to be a subset of amorphous materials that undergo a glass transition—a radical change from viscous to solid elastic characteristics when cooled.

Zachariesen's paper put forward what has since been dubbed the continuous random network (CRN) model of amorphous materials. This suggests that amorphous structures, like solid $SiO_2$, are composed of atoms that all fulfil their bonding requirements in a structure that possesses no crystalline translational symmetry. The structure is well ordered locally, being composed of corner-sharing $SiO_4$ tetrahedra, but has small local distortions to bond angles and bond lengths that lead to large-scale non-crystalline structures.

To date, many high-quality computer models have been built according to the CRN hypothesis. Discrepancies between these models and experimental data still remain beyond the limits of experimental uncertainty, but most scientists accept the CRN model as an idealisation of amorphous structures [Wright (2013)].

CRNs are idealised since they do not consider the effects of dangling bonds—defects resulting from unfulfilled bonding requirements. Amorphous silicon is known to contain many dangling bonds which are eliminated through hydrogenation to form a-Si:H, greatly reducing the density of defects and improving its electronic properties (Street, 1991). Kumar et al. (2012) modelled amorphous graphene through simulated annealing and molecular dynamics and suggest that its experimental realisation offers a great opportunity to study the true nature of the amorphous state; amorphous graphene, being two-dimensional, can be completely characterised in terms of its network statistics, unlike three-dimensional structures.

Continuing debate over the physicality of continuous random networks does not diminish the utility of the tools that have been developed to model them; they are applicable to the design of photonic structures since the best PBGs are produced by uniformising the local geometric and spatial order.

Simulated Annealing and the WWW Algorithm

A brute force approach to producing a computational model of an amorphous network is not practical. The continuum of point positions and large number of possible topologies render a simultaneous optimisation of these properties intractable. Therefore a more efficient method for sampling the configuration space of the structure is required. A solution is to apply a simulated annealing algorithm.

Simulated annealing algorithms are a broad class of methods which are inspired by the Metropolis algorithm (Metropolis, 1953). It is a stochastic Monte Carlo simulation procedure which consists of transitions between two states of a model according to the Metropolis transition probability:

$$p = \min\left[1, e^{\frac{E_j - E_i}{k_b T}}\right] \quad (3)$$

where $E_i$ and $E_j$ represent the energies of the current and proposed states respectively and T is the temperature. The energies are calculated by defining a potential energy function for the network.

The states of the model evolved according to the simulated annealing algorithm form a discrete-time Markov chain. All states are mutually accessible, although almost always not directly, and so the system is ergodic. By the ergodic convergence theorem, the probability distribution converges to a stationary state in which the probability of a given state of the model n occurring is given by the Boltzmann distribution:

$$P_n = \frac{1}{Z} e^{-E_n/k_B T} \qquad (4)$$

where the partition function Z is given by:

$$Z = \sum_i e^{-E_n/k_B T} \qquad (5)$$

It is possible to drive the system to a deep local minimum of the potential function by gradually lowering the temperature from some $T_{max}$ to zero according to a user-defined annealing schedule. It can be proven that an annealing schedule where $T(k)=c/\log(1+k)$, for k the number of steps that the Markov chain has taken, will converge to the global energy minimum so long as the constant c is greater than the depth of the deepest non-global energy minimum (Hajek, 1998). However, such a schedule is often impractical since it tends to zero very slowly and it is necessary to settle for something faster. Faster annealing schedules may prevent convergence to the global minimum and instead converge on a deep local minimum, in our case an amorphous state (Hejna, 2013).

In 1984 Wooten, Winer and Weaire used the ideas of simulated annealing to develop an algorithm to produce models of amorphous silicon (Wooten, 1985). Starting from the crystalline silicon state under periodic boundary conditions, they repeatedly altered the structure's topology with the introduction of Stone-Wales defects. It will be appreciated that the topology of a network is a description of its interconnectedness. It does not describe the network's spatial arrangement. A topological map is a table that lists every vertex in a network together with the vertices to which it is connected.

Figure 1:
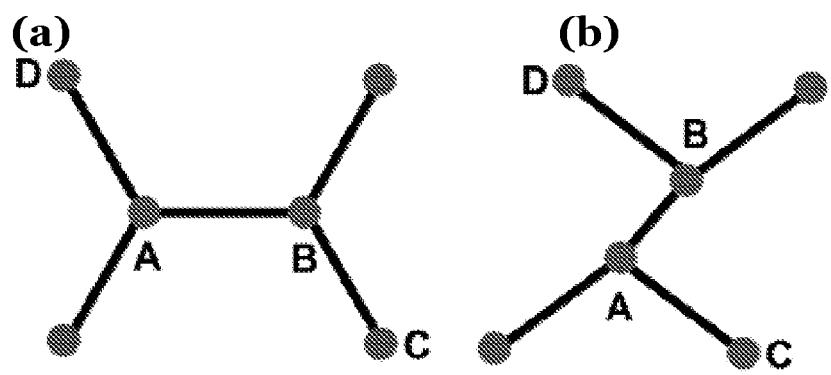
FIG. 1 illustrates how a Stone-Wales defect alters the topology of the network in FIG. 1(a) to give the network in FIG. 1(b)

The principle of Stone-Wales defects is explained with reference to FIG. 1 where FIG. 1a represents a section of a network, which may be either crystalline or amorphous, before addition of a defect and FIG. 1b represents the same section after addition of a defect. The section comprises four atoms or vertices A, B, C and D. When the defect is added, the bond or connection between A and B remains constant, but C breaks its bond or connection to B and instead bonds or connects to A, and D breaks its bond or connection to A and bonds or connects to B. The defect alters the ring statistics; a single defect in a honeycomb network creates two 7-member rings and two 5-member rings.

The introduction of Stone-Wales defects by Wooten, Winer and Weaire generated a highly distorted silicon network. Then, in order to reach a local energy minimum amorphous state, they applied the simulated annealing methodology as follows:

1. Introduce a random Stone-Wales defect.
2. Relax the network by altering the atomic positions, thus achieving the energy minimum for the given topology.
3. Accept or reject the new configuration according to equation 3.
4. Repeat steps 1 to 3 until a good amorphous state is found; each cycle is an iteration.

The energy was defined according to a Keating potential that takes account of two-body and three-body interactions. It is defined as:

$$E_k = \frac{\alpha}{d^2} \sum_{i,j} (r_{ij} \cdot r_{ij} - d^2)^2 + \frac{\beta}{d^2} \sum_{i,j,k} \left(r_{ij} \cdot r_{ik} + \frac{d^2}{3}\right)^2 \qquad (6)$$

where $r_i$ represents the position of atom i and $r_{ij}=r_i-r_j$ the relative vector between atoms i and j. The first term is a bond stretching term; it is greater than zero for bond or cross member lengths not equal to the target value d. The summation is a double sum—first over all atoms bonded to atom i, and then over all possible choices of i. The second term is a bond bending term; it is greater than zero for bond or cross member angles not equal to $\arccos(-1/3)$—that is the crystalline silicon bond angle of 109.5°. For an atom i, the summation takes place over all pairs of neighbours j and k and then over all choices of i. The scalar coefficients $\alpha$ and $\beta$ provide a means of weighting the relative contributions of the bond stretching and bond bending terms to the overall potential; increasing $\alpha$ for instance results in structures with tighter cross member length distributions at the expense of the cross member angle distribution width.

Both terms of the Keating energy are quadratic about the crystalline energy minimum; this is a sensible approximation as small deviations from a local minimum can always be approximated as quadratic. The Keating energy yields successful descriptions of the elastic properties of a-Si—this was in fact its original purpose. Further, it is computationaly simple to evaluate, needing only the point positions and a bond look-up table, and its evaluation scales linearly with particle number. However, it is possible for two atoms which are not bonded together to become unphysically close. It is important to monitor the structure and to take appropriate action if this does occur.

Wooten, Winer and Weaire used their algorithm to build 216-atom models of a-Si having radial distribution functions in good qualitative agreement with experimental data. The Wooten, Winer Weaire (WWW) algorithm has since become a key tool in the modelling of amorphous structures, and has been used to successfully produce models of a-Si, a-Ge, a-SiO$_2$, a-Se and a-H$_2$O (Hejna, 2013).

Efficient Annealing

The WWW algorithm makes up the core process of later enhanced simulated annealing algorithms. The simulation of the largest known model of amorphous silicon, 100,000 atoms in the form of a 300,000 atom SiO$_2$ network, was made possible by years of work on making the WWW algorithm more efficient and scalable. Here we outline these enhancements:

Quenching

The WWW algorithm moves stochastically through the energy landscape and, with a well-chosen annealing schedule, providing a good way of moving the structure into a low energy region of the configuration space. However, to let the WWW algorithm find a good minimum by lowering the temperature all the way to zero is not time efficient. Quenching is a more efficient means of finding deep local minima.

The slow convergence rate of the WWW search is a result of the Metropolis acceptance criterion; there is a non-zero probability that the network can evolve into any unfavourable state. This is, however, what makes the algorithm effective; its ability to jump out of favourable states allows a more complete exploration of the configuration space. A quench on the other hand is a strictly downhill search in which the only accepted alterations are those which lower the structure's energy. This is equivalent to applying the WWW process at zero temperature.

An efficient quench should drive the structure to the bottom of an accessible local minimum. To achieve this, one must construct a list of all possible Stone-Wales defects and then try them in turn. It is not necessary to attempt the same defect more than once since, once tried and rejected, it will always be rejected. If a defect results in an energy decrease then the network is evolved. A new Stone-Wales defect list is then created and we try all defects in turn again. The quench is completed once all defects have been attempted and none have been found to lower the Keating energy.

Random Initial Configurations

Rather than starting from the crystalline state as Wooten et al. did, it is beneficial to use a random configuration of points and connections. This eliminates the potential that the structure has some memory of the crystalline state and ensures that the resulting configuration is truly amorphous. N points can be readily randomly positioned in the simulation domain under periodic boundary conditions. These must then be mutually connected to ensure strict four-valency; a possible algorithm for making these connections is given in Barkema & Mousseau (2000).

Figure 2:
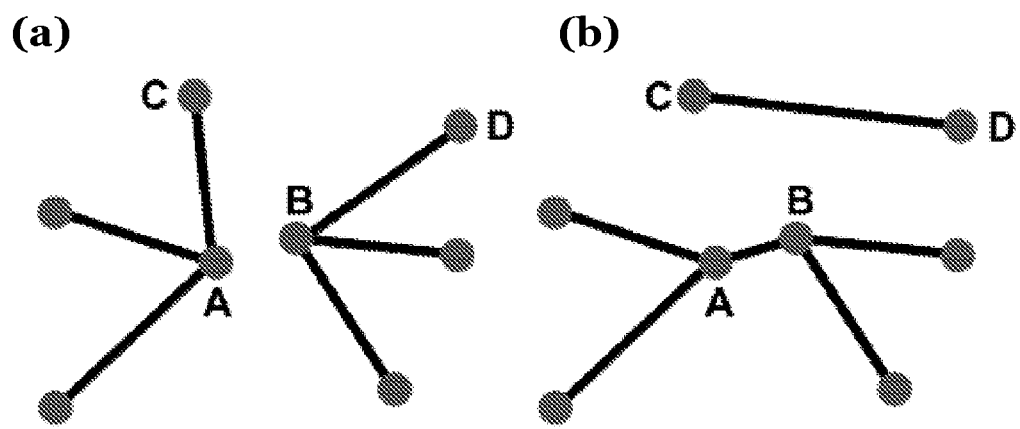
FIG. 2 illustrates how when two atoms come into close proximity, as illustrated in FIG. 2(a), they may be forcibly connected together, as illustrated in FIG. 2(b)

This initial configuration is highly strained and so it is immediately quenched. During this initial quench, it is possible for two atoms to come into close proximity without being bonded, this is shown in FIG. 2a. If this occurs, they are forcibly bonded together, as shown in FIG. 2b. The exact method used to initially connect the points is not very important. Once quenched, the resulting network is a high-energy CRN without any unphysically close points that can be used as an initial configuration for simulated annealing.

Local Relaxation of Defects

An optimisation of all 3N point position variables is computationally very expensive. A local relaxation therefore optimises only the positions of those points near an introduced defect. Points near to a defect can be defined either spatially, being contained within some sphere of specified radius centred on the defect, or topologically, that is within a given number of edges from the defect atoms. This renders the number of optimised variables independent of the total size of the structure and makes the algorithm more scalable.

Incomplete Relaxation

It is possible to curtail optimisation calculations that are unlikely to yield a favourable state, thus avoiding wasted CPU cycles. We do this by recasting the Metropolis criterion and making a decision beforehand on what constitutes an acceptable final energy. We write:

$$E_t = E_b - k_B T \ln(s), \quad (7)$$

where $E_b$ and $E_t$ are the initial and target final energies, respectively, and s is a uniformly distributed random number on [0,1]. Relaxation brings the network to the minimum energy state for the given topology, and as this minimum is approached the energy will vary quadratically. At each step of the relaxation procedure we can thus estimate what the final energy is going to be through:

$$E_f \approx E - c_f |F|^2 \quad (8)$$

$E_f$ and E are the final and current energies, respectively, $|F|$ is the total Keating force—the gradient of the Keating potential—and $c_f$ is an empirically determined constant. If at any point during the relaxation procedure we find that $E_f > E_t$ then we can abort the process and try a different defect.

Parallelisation

An efficient parallelisation paradigm is discussed in Vink and Barkema (Vink, 2001) and is used, along with the above enhancements, to produce a 100 k model. Here we do not go into the detail of their parallelisation scheme since it is not the same as what we later apply. It is sufficient to remark that parallelisation is a necessary enhancement that enables multiple Stone-Wales defects to be attempted simultaneously—this is time efficient at low temperatures when it can be necessary to relax O(1000) defects before accepting a move.

EXAMPLE 2: GENERATING AND CHARACTERISING AN A-TRIMENE STRUCTURE

Method

The inventors wished to generate an amorphous trivalent network. A trivalent crystalline consists of multiple trihedra. The crystalline structure of a trihedron, shown in FIG. 3a, is a planar geometric shape consisting of four vertices and three cross members. Its central vertex (A) is connected by the cross members to three outer vertices (B, C and D). All cross member angles are 120° and all cross member lengths are identical.

A third parameter is the skew angle of the trihedron, which measures how co-planar the four vertices are. It will be appreciated that three points in space necessarily form a plane. Accordingly, the central vertex (A) forms a plane with two of the other vertices (B and C), and the skew angle is defined as the angle between the normal to the plane ABC and the bond A→D. Accordingly, the trihedron has three measurable skew angles, all of which are 90° for the perfect trihedron.

Two trihedra together provide the basic unit of the trivalent crystalline network, referred to as a "five-legged scatterer". This is shown in FIG. 3b where the first trihedron comprises vertices A, B, C and D and the second trihedron comprises vertices A, C, E and F. The two trihedra are arranged to have a dihedral angle, i.e. there are 'twisted' about the shared bond connecting vertices A and C. In the crystalline material this dihedral angle has a value of arccos (−⅓)=109.47°, i.e. the angle between the normal to the plane ABD and the normal to the plane CEF is 109.47°.

To create a model of amorphous triamond the inventors applied the enhanced WWW algorithm to a three-dimensional strictly trivalent network. Naturally they altered the Keating potential so as to take account of the triamond's different local geometry. It therefore becomes:

$$E_k = \frac{\alpha}{d^2} \sum_{i,j} (r_{ij} \cdot r_{ij} - d^2)^2 + \frac{\beta}{d^2} \sum_{i,j,k} \left(r_{ij} \cdot r_{ik} + \frac{d^2}{2}\right)^2 \quad (9)$$

This modified potential has a minimum when all cross member angles around a given atom have a value of arccos (−½)—that is 120° as in crystalline triamond. From this point forward the Keating potential is understood as referring to above.

The simulation domain was a cubic box of dimension L. Structures were simulated under periodic boundary conditions. At the edges of the domain the network connects back onto itself; cross members that cross the edge are thus rendered possible, as shown in FIG. 4. The overall topology of the system is therefore toroidal; a two-dimensional system is rolled up into a three-dimensional torus and a three-dimensional system into a four-dimensional hypertorus.

Three principal data structures were used to describe the network. These were the point positions, stored as XYZ triads, the bonding table, a 3 by N table listing each particle's three bonded neighbours, and a set of 3N 3-vectors, each describing the translation of a bond within the system.

The annealing algorithm was written in MATLAB in order to take advantage of its substantial toolbox of optimisation algorithms. Parallelisation was achieved by testing N Stone-Wales defects across N workers simultaneously. Once all workers complete their tests, they report back to the control worker on the success of their trial configuration. If any configurations succeed then one is chosen (randomly if there are several) and the network is evolved, otherwise another N defects are attempted.

Defects were accepted/rejected based on a local relaxation of the structure. All points within a radius R of the defect were relaxed; R was chosen such that the region contained approximately 120 points. In spite of the potential efficiency improvements, incomplete relaxation of unpromising defects was not implemented. This was due to difficulties implementing complex parallel programming in the MATLAB environment.

Random initial point configurations were used to seed the networks. These were generated in accordance with the method recommended by Barkema and Mousseau (Barkema, 2000) and then quenched to form a strained trivalent network. Total annealing times were such that each point was directly involved in $O(10^2)$ bond transposition events. Annealing schedules were of the form:

$$T(k) = \begin{cases} \varepsilon + \dfrac{c}{k} & k \leq k_c \\ \left(\varepsilon + \dfrac{c}{k_c}\right) - m(k - k_c) & k > k_c \end{cases} \quad (10)$$

for constants $\varepsilon$, c and m. Annealing schedules were chosen so as not to be 'too steep'; a rapid decrease in temperature led to the network becoming stuck in shallow energy minima. Annealing constants were chosen in light of this but were not optimised for rapid convergence on a good amorphous state. Once sufficiently annealed, structures were quenched into a deep local energy minimum.

This method produced high quality amorphous networks which the inventors call amorphous trimene (a-trimene).

Analysis

Figure 5:
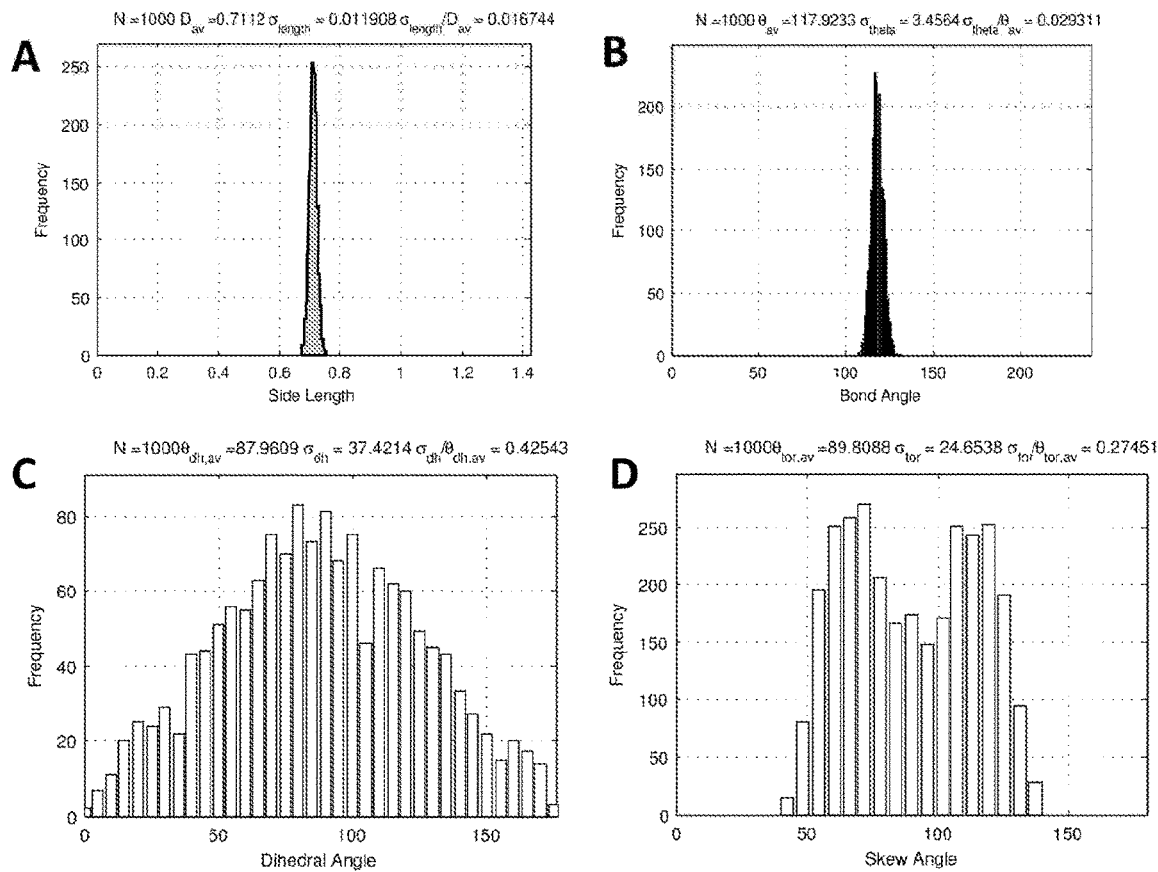
FIG. 5 is four graphs showing (A) the distribution of cross member lengths within a-trimene; (B) the distribution of cross member angles within a-trimene; (C) the distribution of dihedral angles within a-trimene; and (D) the distribution of skew angles within a-trimene.
Figure 6:
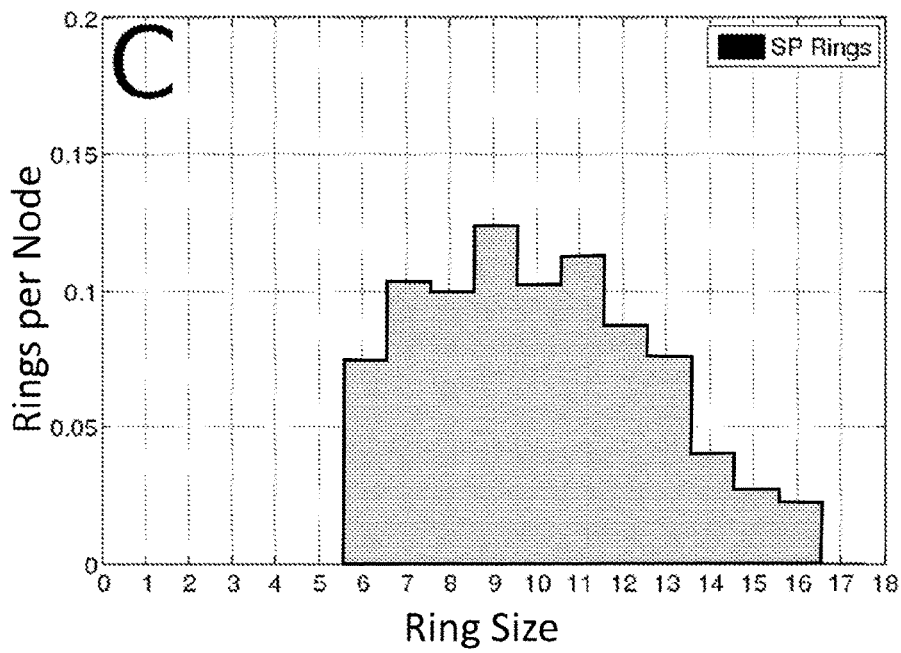
FIG. 6 is a graph showing the ring size distribution within a-trimene.

Graphs showing the distribution of the cross member length, skew angle, cross member angle and dihedral angle in a-trimene are shown in FIG. 5. The inventors have achieved much tighter cross member length and angle distributions than in the best models of amorphous diamond; this is due to the fewer constraints on network rearrangement in a trivalent network compared to a tetravalent one. The skew angle distribution shows that the majority of trihedra are no longer planar. The dihedral angle distribution shows no regard for its crystalline form. The ring size distribution, shown in FIG. 6, is fairly broad with a substantial number of small 6-membered rings and some very large 15 and 16-membered rings.

It will be appreciated that the dihedral angle distribution, shown in graph (C) of FIG. 5, possesses no distinct peaks. For this reason the inventors consider a-trimene a bad amorphous analogue of crystalline triamond.

FIG. 7a illustrates what an a-trimene structure can look like; here the point pattern is shown decorated by thin cylinders. The radial distribution function ($g^2(r)$) of the underlying point pattern, which measures the relative probability of finding a vertex point at a given distance from some other chosen vertex point, is shown in FIG. 7b. The radial distribution pattern for a-trimene has a very narrow first peak, reflecting the extremely narrow cross member length distribution. No clear peaks are visible beyond the second peak, and $g^2(r)$ decays to a constant value of 1 for $r/r_o > 2$, suggesting that any local geometrical order extends no further than this.

It may be appreciated that the cross member length, cross member angle and skew angle comprises a distribution of the type shown in FIG. 18. In each case the distribution defines an average value of x, and the distribution may be measured by defining the percentage of the distribution which fall between a lower boundary, which is less than the mean cross member length, and an upper boundary, which is greater than the mean cross member length. As shown in FIG. 18, a % of values fall between LBα % and UBα %. The remaining values, (100−α)%, fall below LBα % or above UBα %, such that half of the remaining values fall below LBα %, and the other half fall above UBα %.

It will be appreciated that unlike the cross member length, cross member angle and skew angle, when the system is ordered the dihedral angle comprises a distribution with two clear maxima at 70.53° and 109.47°. This is because unless the dihedral angle is 90°, it can have two values. Accordingly, if a measurement of x° is taken for the dihedral angle, it could also be expressed as (180−x)°. To allow meaningful analysis of the distribution of the dihedral angle, the values shown in FIG. 5 were manipulated such that the dihedral angle was always expressed as being greater than 90°. This data can then be analysed to determine values for LBα % and UBα %, as explained above.

Accordingly, the distribution of the variables within a-trimene is shown in table 1.

TABLE 1

Distribution of cross member length, cross member angle, dihedral angle and skew angle within a-trimene

|  | LB70% | UB70% | LB80% | UB80% | LB90% | UB90% |
| --- | --- | --- | --- | --- | --- | --- |
| Cross member length/ % of mean | 97.6 | 102.0 | 97.1 | 102.5° | 96.3 | 103.2 |
| Cross member angle | 113° | 122° | 112° | 123° | 111° | 124° |
| Dihedral angle | 95° | 144° | 93° | 150° | 90° | 158° |
| Skew angle | 57° | 117° | 52° | 121° | 47° | 126° |

EXAMPLE 3: GENERATING AND CHARACTERISING AN A-TRIAMOND STRUCTURE

Method

It is unclear whether continued annealing of the a-trimene samples obtained in example 2 using the Keating potential would yield structures with greater triamond-like local geometry. It is possible that orders of magnitude more bond transpositions per point, like those achieved by Vink and Barkema (Vink, 2001) and Hejna (Hejna, 2013), could produce the desired local geometry; this is certainly the case in amorphous diamond, in which the amorphous structure develops a clear signature of the diamond dihedral angle using the Keating potential alone.

To increase the pressure driving the structures to a triamond-like geometry the inventors introduce a new triamond potential that takes account of third-order particle interactions. This is defined as:

$$E_T = E_K + \gamma \sum_i \sum_j \left( \text{abs}(\hat{n}_{i_1 i_2} \cdot \hat{n}_{j_1 j_2}) - \frac{1}{3} \right) + \delta \sum_i \sum_j (r_{ij} \cdot (\hat{n}_{i_1 i_2} \cdot \hat{n}_{j_1 j_2})) \quad (11)$$

where $$\hat{n}_{j_1 j_2} = \frac{r_{j_1 j} \times r_{j_2 j}}{|r_{j_1 j}||r_{j_2 j}|}$$

and $$\hat{n}_{i_1 i_2} = \frac{r_{i_1 i} \times r_{i_2 i}}{|r_{i_1 i}||r_{i_2 i}|}$$

The inventors add two more terms that describe the dihedral geometry, as explained below.

The inventors imagined that two points, i and j, are bonded. Each has two more bonded neighbours—these are $i_1$ and $i_2$ and $j_1$ and $j_2$ respectively. The inventors formed the unit normals to the (i,$i_1$,$i_2$) and (j,$j_1$,$j_2$) planes and take their scalar product to determine the cosine of the dihedral angle between them. The inventors take its absolute value—this is thus minimised for a values of arccos($\pm \frac{1}{3}$). In doing so the network is driven to dihedral angles of 70.53° and 109.47°.

The inventors chose to do this because of the difficulties in consistently defining the directions of the vectors $$\hat{n}_{i_1 i_2};$$

the cross-product, being antisymmetric, is thus sensitive to the labelling of the atoms. With the bonding table continually evolving consistent labelling is difficult to accomplish. The inventors therefore settled for allowing dihedral angles of both 70.53° and 109.47°.

Further, the inventors added an extra term to remove the degeneracy of possible configurations satisfying the dihedral condition. They did this by demanding that the bond between two dihedral planes be normal to both plane normals. The contribution of these terms was controlled with coefficients $\gamma$ and $\delta$.

The inclusion of third-order neighbour terms increases the computational complexity. The runtime of the inventors' best implementation of the triamond potential was a factor of ~2 longer than a Keating calculation. This naturally has knock-on effects on overall annealing runtimes.

The inventors call networks produced by annealing with the triamond potential amorphous triamond (a-triamond). Production of a-triamond samples required careful balance between the coefficients $\alpha$, $\beta$, $\gamma$ and $\delta$. It was found that 'large' values of $\gamma$ distorted the networks, causing them to fold in on themselves unphysically and never recover—the inventors refer to this as network instability. An effective set of coefficients was found to be $\alpha = \beta = 0.7$, $\gamma = 0.3$ and $\delta = 0.4$. This set of values seems natural. Relatively high $\alpha$ and $\beta$ values ensure that the basic trihedral unit is fairly rigid—a quality that guards against excessive local network deformation. Further, in a true crystal the strength of neighbour interactions naturally decreases with distance.

In order to assure network stability the inventors adopted the following protocol to produce a-triamond samples. First, high quality a-trimene samples were produced in the manner discussed in example 2. These structures were then used as starting points for triamond potential annealing. Annealing schedules were again of the form in described in example 2, but annealing times were twice as long in terms of accepted Stone-Wales defects. This was designed to allow greater time for the rigid trihedra to rearrange. Once sufficiently annealed the structures were quenched.

Analysis

FIG. 8 shows simulated slices through the total scattering structure functions (TSSFs) for crystal triamond and a-triamond structures. The TSSF can be measured in an X-ray or neutron diffraction experiment. X-ray scattering occurs due to photons interacting with regions of electron density in a sample. In the case of the structures of the present invention, air is non-scattering while some continuous distribution of material is electron-dense and will scatter photons.

As expected, the diffraction pattern for crystal triamond, shown in FIG. 8a, has a lot of symmetries—indicative of the crystal symmetry of its structure. Conversely, the diffraction pattern for a-triamond, shown in FIG. 8b, shows no such well-defined symmetries. Instead it shows a characteristic amorphous material diffraction pattern—it has an average circular symmetry with clear bands of intensity at particular radii.

Figure 9:
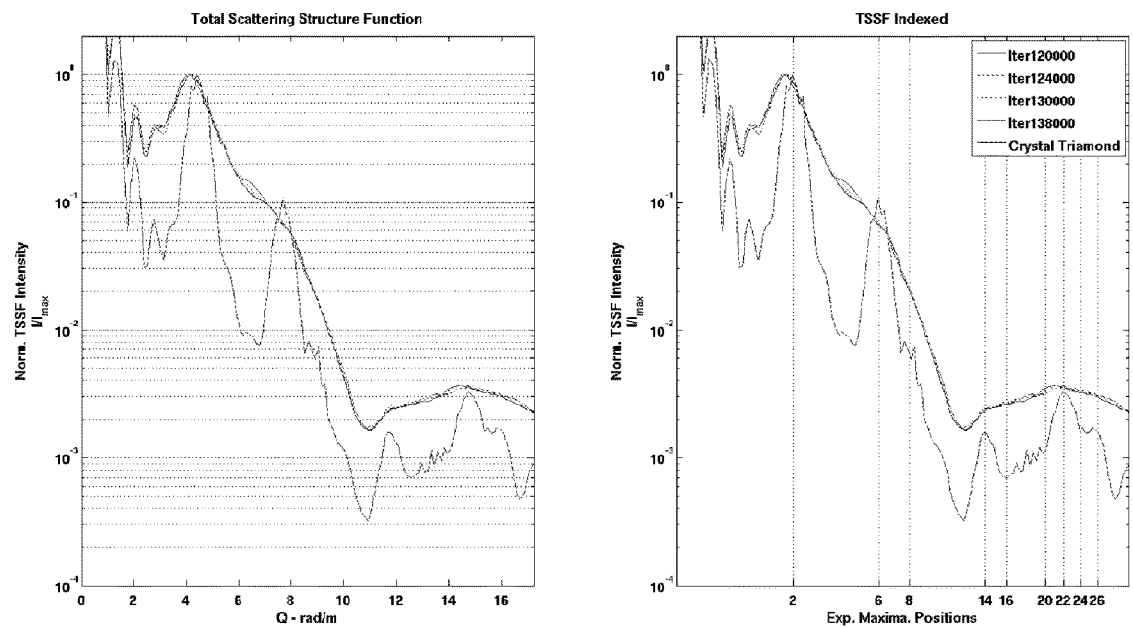
FIG. 9 is a comparison of radially averaged total scattering structure functions (TSSFs) for unit-density a-triamond and crystal triamond structures with a volume fill fraction of 29%, in the right hand graph expected diffraction peak positions are marked for a gyroidal symmetry.

A common way to present the diffraction pattern of a sample is as a radially-averaged scattered intensity. Accordingly, FIG. 9 shows radially averaged diffraction spectra for a 1000-point crystal triamond sample compared with a selection of 1000-point a-triamond samples. All samples have a material filling fraction of ~30%. As can be seen on the indexed pattern on the right, we see the well-defined intensity peaks of the crystal are exactly where we expect them to be.

The a-triamond structures, on the other hand, show only a single clearly defined peak (the [110] type peak), but broadly follow the spectrum of crystal triamond. Higher order diffraction peaks appear to blur together—indicative of a distortion to the crystalline geometry as the scattering probes increasing lengthscales. The diffraction spectra for the four different 1000-point a-triamond samples are all very similar. This suggests that the diffraction spectrum of a-triamond is a characteristic measurable quantity.

Figure 10:
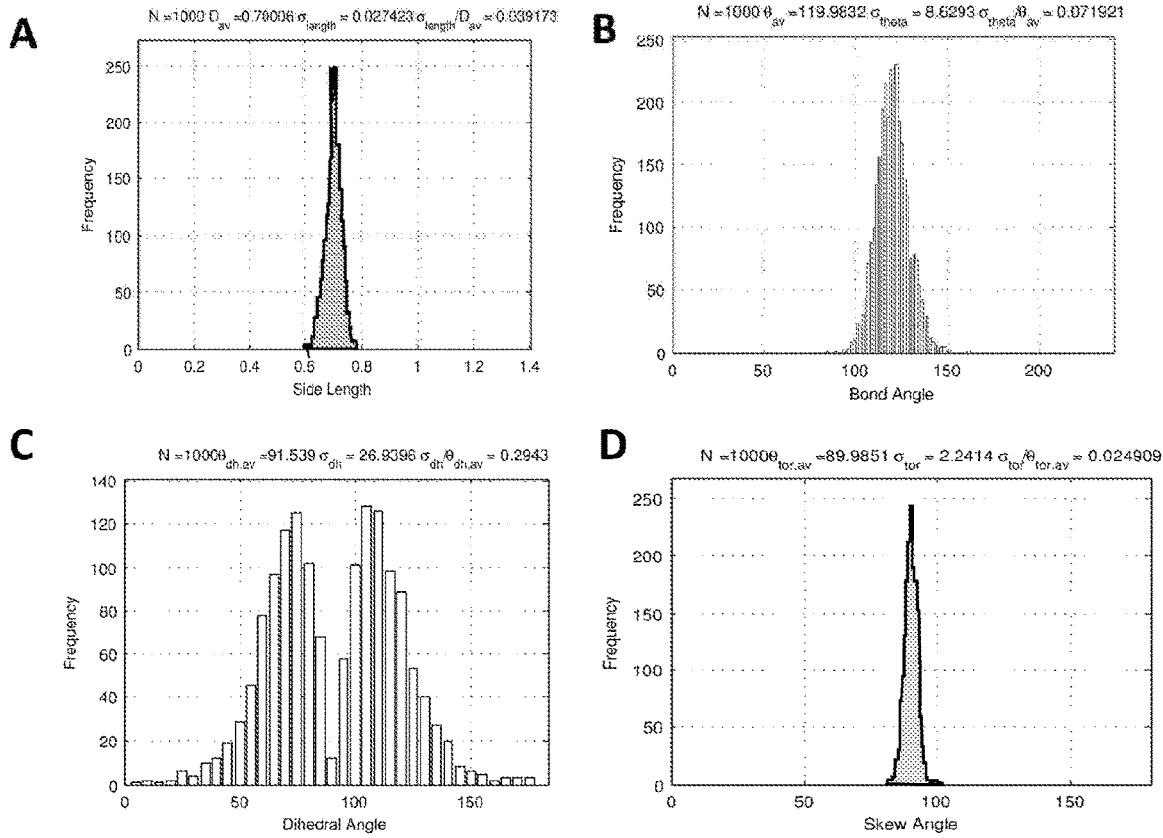
FIG. 10 is four graphs showing (A) the distribution of cross member lengths within a-triamond; (B) the distribution of cross member angles within a-triamond; (C) the distribution of dihedral angles within a-triamond; and (D) the distribution of skew angles within a-triamond.

FIG. 10 shows the cross member length and angle distributions for a typical a-triamond network. The dihedral angle distribution is much more crystalline than in a-trimene and the trihedral planes show very little skew. The dihedral distribution is bimodal around the allowed values of 70.53° and 109.47°. Accordingly, the local environment about a point is still chiral, but not necessarily the same dihedral geometry as in triamond.

The cross member length and cross member angle distributions are more widely distributed than in a-trimene as a consequence of optimising the skew and dihedral angles.

Figure 11:
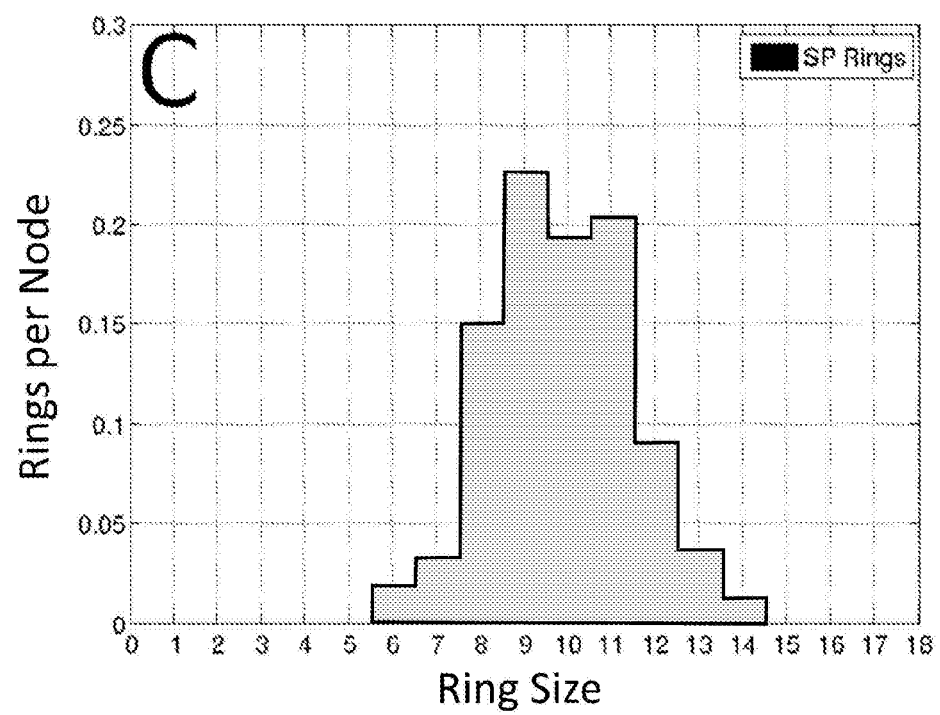
FIG. 11 is a graph showing the ring size distribution within a-triamond.

The ring size distribution, shown in FIG. 11, is more tightly distributed than in a-trimene, showing an improved resemblance to crystalline triamond, which would have a single peak at n=10. This increased topological order is thought to lead to a more uniform local density.

Figure 12A:
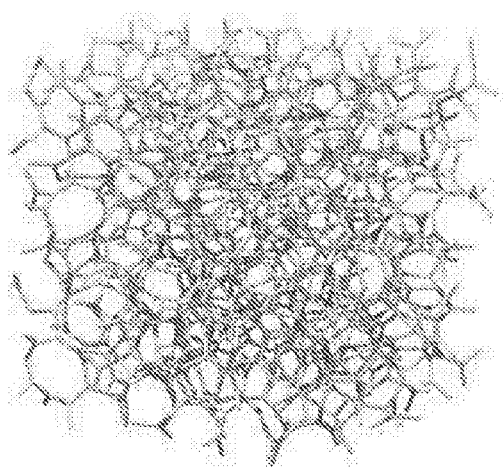
FIG. 12a is an illustration of a 1000-point a-triamond structure.
Figure 12B:
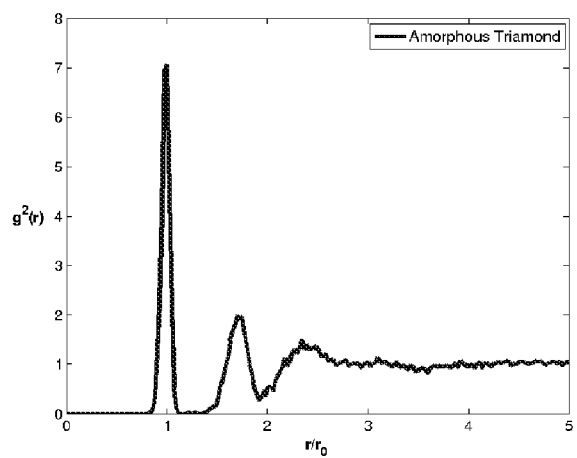

FIG. 12a illustrates what an a-triamond structure can look like. Similarly to FIG. 7a, the point pattern is shown decorated by thin cylinders. The radial distribution function ($g^2(r)$) of the underlying point pattern, which measures the relative probability of finding a vertex point at a given distance from some other chosen vertex point, is shown in FIG. 12b. The radial distribution pattern for a-triamond has wider first and second peaks than a-trimene, due to the increased variability in cross member length. However, unlike a-trimene, the radial distribution function for a-triamond has a clear third peak, and decays to a value of one for around $r/r_o > 3$. Accordingly, a-triamond clearly has increased local geometrical order relative to a-trimene.

The distribution of the variables within a sample of a-triamond which was found to contain a complete photonic band gap of greater than 4% for materials with a dielectric constant of 13:1 is shown in table 2.

TABLE 2

Distribution of cross member length, cross member angle, dihedral angle and skew angle within a sample of a-triamond comprising a complete photonic band gap of greater than 4% for materials with a dielectric constant of 13:1

|  | LB70% | UB70% | LB80% | UB80% | LB90% | UB90% |
| --- | --- | --- | --- | --- | --- | --- |
| Cross member length/ % of mean | 94.2 | 105.2 | 92.8 | 106.2° | 90.5 | 107.8 |
| Cross member angle | 106° | 130° | 103° | 134° | 99° | 138° |
| Dihedral angle | 98° | 130° | 96° | 137° | 93° | 149° |
| Skew angle | 87° | 93° | 86° | 93° | 85° | 94° |

It will be immediately apparent that the cross member length and cross member angle have a much greater distribution than for a-trimene. Conversely, the dihedral angle and skew angle has a much narrower distribution than for a-trimene.

Similarly, the distribution of the variables within a sample of a-triamond which was found to contain a complete photonic bandgap of greater than 12% for materials with a dielectric constant of 13:1 is shown in table 3.

TABLE 3

Distribution of cross member length, cross member angle, dihedral angle and skew angle within a sample of a-triamond comprising a complete photonic band gap of greater than 12% for materials with a dielectric constant of 13:1

|  | LB70% | UB70% | LB80% | UB80% | LB90% | UB90% |
| --- | --- | --- | --- | --- | --- | --- |
| Cross member length/ % of mean | 95.8 | 103.4 | 94.9 | 104.3° | 93.4 | 105.6 |
| Cross member angle | 110° | 128° | 108° | 130° | 105° | 134° |
| Dihedral angle | 97° | 123° | 96° | 127° | 93° | 133° |
| Skew angle | 88° | 92° | 87° | 93° | 86° | 93° |

It will be apparent that all of the variables are more narrowly distributed in the a-triamond sample with the broader complete photonic band gap.

Table 4 compares the variability of the cross member length and cross member angle distributions for typical 1000-point a-trimene and a-triamond networks and Hejna's best Keating potential annealed amorphous diamond model (HejK5) as measured by their fractional standard deviations.

TABLE 4

Comparing the variability of the cross member length and cross member angle distributions for typical 1000-point a-trimene and a-triamond networks and Hejna's best Keating potential annealed amorphous diamond model (HejK5) as measured by their fractional standard deviations

|  | $\sigma_r/\bar{r}$ | $\sigma_\theta/\bar{\theta}$ | $\sigma_{skew}\theta_{skew}$ | $\sigma_{dih}\theta_{dih}$ |
| --- | --- | --- | --- | --- |
| a-trimene | 1.70% | 2.90% | 27.50% | 42.50% |
| a-triamond | 3.90% | 7.20% | 2.50% | 29.40% |
| HejK5 | 3.60% | 7.90% | n/a | n/a |

Although the Hejna model has been annealed for longer, the a-trimene model has much reduced cross member length and cross member angle standard deviations compared to a good model of amorphous diamond.

EXAMPLE 4: COMPUTATIONAL EXPERIMENTS

Using a refractive index contrast of 13 (corresponding to air and silicon) the inventors modelled the photonic band structure of one of the 512-point a-triamond networks produced in example 3. The 512-point sample was chosen due to the long runtimes necessary for large supercell calculations. A smaller sample allowed the inventors to explore the band structure more fully.

Figure 13:
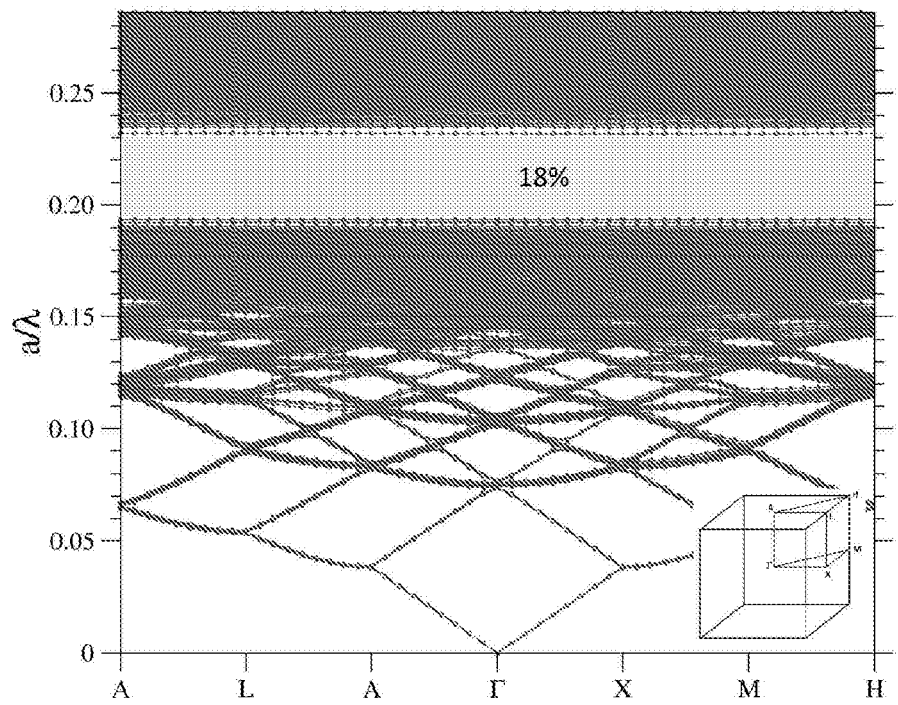
FIG. 13 is the photonic band structure of an a-triamond 512-point network, the k-space path is illustrated in the inset.
Figure 14A:
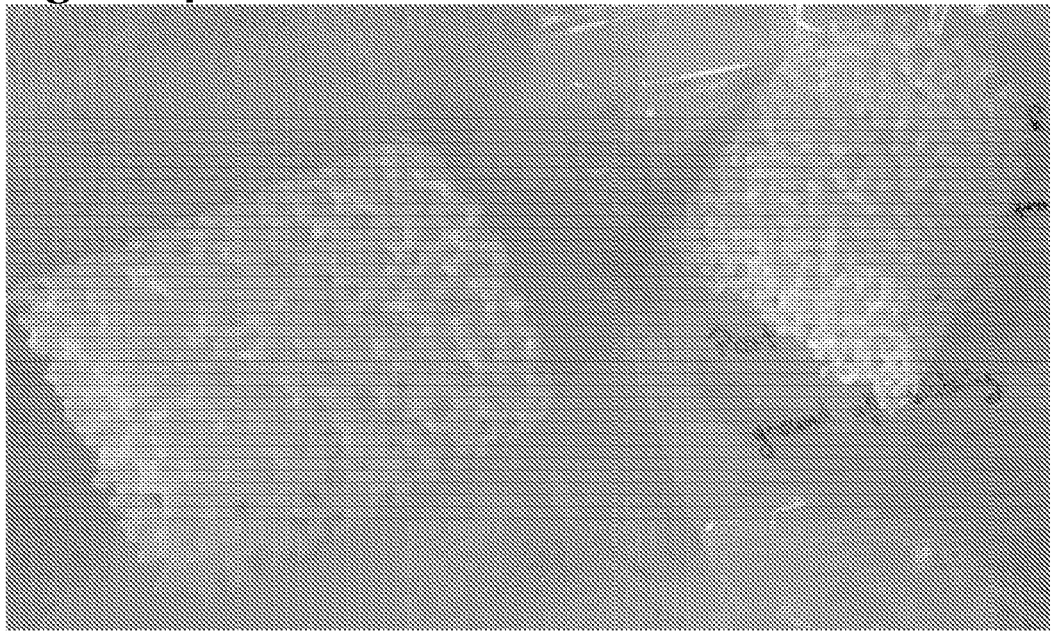
Figure 14B:
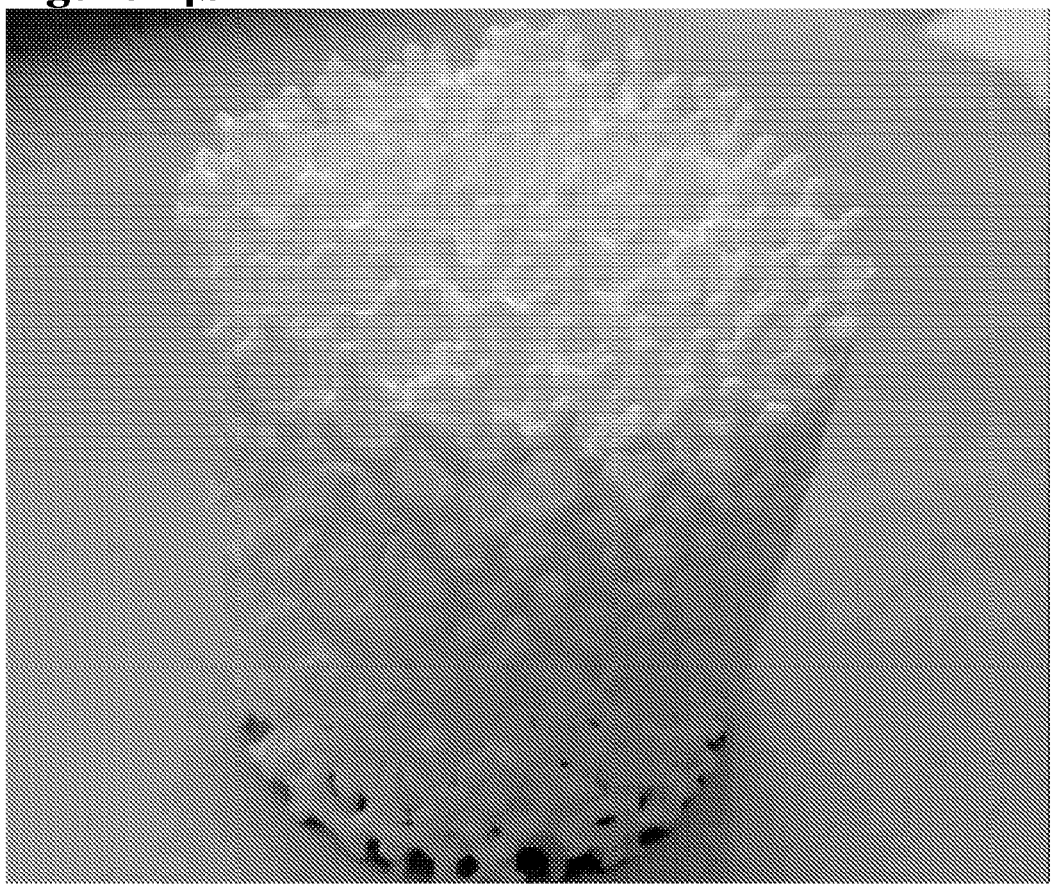
Figure 14C:
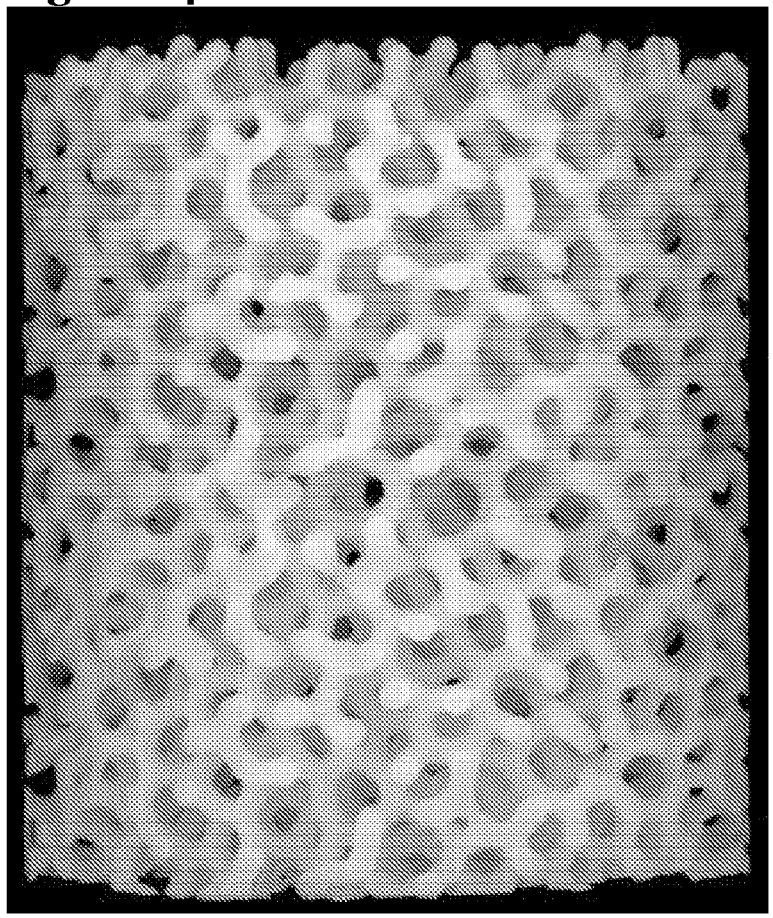
Figure 14D:
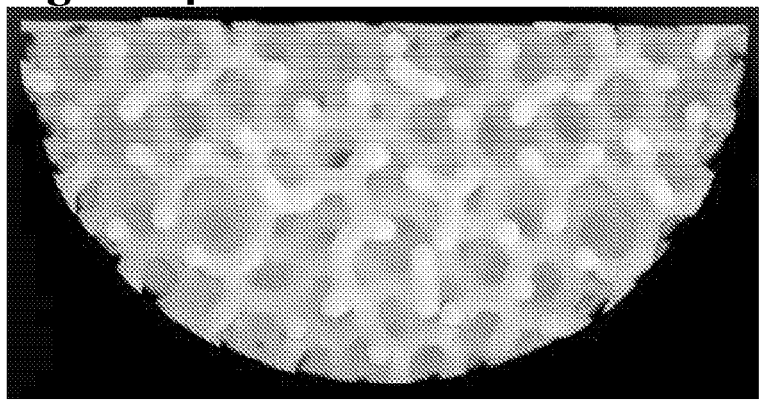

The results are shown in FIG. 13 and the k-space path is illustrated in the inset. It will be appreciated that k space is a three-dimensional space within which a point corresponds to a particular direction and wavelength of propagating light. For technical reasons, we can dispose of the wavelength aspect and consider a point in k-space as representing a particular propagation direction in the a-trimond structure. The directions probed correspond to the set of vectors from the origin (F point) to the points defined by the line traced out by the sequence of points along the x-axis. Although only a set of possible directions in 3D space were probed, the a-trimond structure is statistically isotropic such that its optical properties are the same in all directions. Sampling this subset is thus sufficient to demonstrate its complete band gap for all propagation directions.

FIG. 13 shows that the sample possesses a complete photonic band gap with width $\Delta\omega/\omega_c = 18\%$. This band gap is identical to the 18% achieved by photonic amorphous diamond using the same index contrast (Edagawa, 2008).

Smaller samples of a-triamond having 216 vertices have even achieved PBGs with widths greater than 18%, and in one case even greater than 20%. This is shown in FIG. 19A where the width of the complete PBG is given for a range of samples.

It is unclear whether it is possible to achieve these wide gaps in the larger a-triamond samples, but this may be possible with further annealing.

Conversely, when one of the 1000-point a-trimene samples was similarly tested it was found to possess only a small complete band gap of 2% for the same refractive index contrast. The band structure was calculated along a k space path around the edge of the irreducible Brillouin zone. Not all propagation directions were sampled and, given the small size of the gap, such a band gap is unlikely to be complete.

The small band gap in a-trimene suggests that local skew and dihedral angle order are important factors in the creation of a large complete band gap in a trivalent network.

As an explanation of the difference between band gap widths in a-trimene and a-triamond the inventors suggest that a-trimene does not succeed in fulfilling the design criteria for a successful PBG network. Optimisation with a simple Keating potential actually places significant strain on the network's component trihedra. As a result, most trihedra are deformed such that they are no longer perfectly planar. This breaks the symmetry of these scattering units and renders them distinguishable from one another. Further, a-trimene type networks lack any order in their dihedral angle distributions. Trihedra units are thus connected together with no regard for ensuring the similarities of their local geometrical environments, and thus of their resonant energies. As a result of this continuum of possible local environments, the global electromagnetic resonances that arise are likely to have a continuum of frequencies that fill in the PBG region.

EXAMPLE 5: MICROWAVE EXPERIMENTS

Fabricating the Physical Model

A physical model of a 1000-point a-triamond structure was fabricated in aluminium oxide on a centimetre scale, using a 3D-printing technique for ceramics at the Fraunhofer Institute for Technical Ceramics in Dresden, Germany. The structure was chosen due to its large size and its large calculated PBG of 17% shown in FIG. 19B.

The design procedure outlined in example 3 produced a set of (x,y,z) point positions and a topological map which details all the connections within the structure. To produce the physical structure for it was necessary to decorate this point pattern with physical cross members. A variety of decoration shapes and materials can be suitable, depending on the intended embodiment of the invention. These can be selected by persons skilled in the art in order to meet the design objectives of the device for the wavelength regime of interest. For complete PBG applications, decorations will be made from a material having a high and largely-real refractive index and will have optimised shapes and volumes to maximise the width of the PBG.

Accordingly, the inventors chose to manufacture a cylinder due to its rotational symmetry about its z axis. Additionally, the inventors determined that the individual cross members of the network should have an average length of ~2.2 mm, and a fixed width of 2 mm. These lengths were chosen to endow the structure with a PBG in the region of 22 GHz (~1.2 cm wavelength microwaves).

Accordingly, a cylinder of a-triamond, shown in FIG. 14, which has ~6 cm radius and is ~7 cm high was produced. As shown in FIG. 14a, the cylinder was manufactured as two half cylinder pieces because of constraints imposed on the maximum dimensions that can be printed by the machines at the Fraunhofer Institute. The half-cylinders were designed to fit together and form a complete cylinder, as shown in FIG. 14b, and this has been realised well by the printing process. The match between the two halves of the cylinder is excellent, with any mismatch being on a length scale less than 1/10th of the microwave wavelength.

In spite of this small size, the network is very well resolved and no internal network defects are visible. The inventors estimate that the refractive index of the aluminium oxide from which the network is made are made to be ~3.1 for the 22 GHz microwaves of the experiment.

First Microwave Experiment Methodology

Initial microwave experiments were carried out on the cylinder at the San Francisco State University.

To perform a transmission measurement on the cylinder, the inventors followed the example of Imagawa et al. (2012), who performed a microwave characterisation of photonic amorphous diamond.

The basic set-up is shown in FIG. 15 and consists of a pair of microwave horns (A and E). The transmitter horn (A) transmits microwave radiation in a strongly directed beam which is received by the receiver horn (E). The two horns are connected to a vector analyser, which is capable of measuring the transmission or reflectance of whatever sample is placed between the horns. A pair of teflon microwave lenses (B) are used to focus the radiation from the transmitter horn (A) onto the sample, and more effectively collect transmitted radiation into the receiver horn (E). A microwave absorbing material (D) was used to clad the a-triamond sample such that what was measured is a true transmission as the absorber prevents the detection of waves reflected from the sample surface and ensures that any detected radiation has passed through the sample. To further increase the focusing of the microwave beam onto the sample, a square window was made from microwave absorbing material (C) and placed between the transmitting lens (B) and the sample.

To capture a transmission spectrum, first the analyser must be calibrated. This is achieved by running a transmission spectrum without any sample and recording this as the background spectrum. Then, the sample of interest is placed into the cladding (D). The transmission is recorded and is then divided through by the background. A transmission value of one thus represents perfect transmission, and a value of zero is perfect attenuation.

Both the half cylinder and the complete cylinder were tested using this methodology.

First Microwave Experiment Results

The transmission spectra through both a single halfcylinder of a-triamond and the complete cylinder are shown in FIGS. 16a and 16b, respectively. The graphs contain both the raw and smoothed data. It is useful to smooth the data for visualisation purposes as signals which are strongly attenuated approach the dark noise threshold of the detector. That is, dark noise is a background signal measured even when the transmitter is off; the contribution of this background noise becomes more significant when measuring very low intensity signals.

The inventors found that both models strongly block the signal in the region of 19-23 GHz, which is shaded grey in the graphs, with an average attenuation of around −30 decibels. This is a very strong attenuation and is strong evidence of the existence of a photon band gap.

The measured photon band gap region is wider than anticipated by the inventors, the anticipated band gap is illustrated with dashed lines on the graphs. Accordingly, it can be seen that the lower band edge occurs at a lower value than predicted. The inventors attribute this to an inaccuracy in the original estimation of the refractive index of alumina.

The inventors also note that a strong signal is received below the PBG, but above the PBG the signal never recovers to its initial intensity. This parallels the behaviour observed by Imagawa et al. The fundamental process at work is the scattering of the incident light by the sample. Sub-PBG type modes have been observed to support Bloch-like ballistic propagation, while above the gap propagation is highly diffusive.

These observations are corroborated by microwave transmission spectra for two-dimensional hyperuniform structures measured by Man et al. (2013) who observed both decreased magnitude and increased noise in the transmission above the PBG. The mean free path (the average distance light must travel between scattering events) as a function of frequency was deduced by Imagawa et al. for photonic amorphous diamond. Their findings demonstrate that scattering processes are indeed much more significant above the band-gap than below. As a result, light emerging from the sample is scattered in all directions; it is not all captured by the detector and thus it is possible to explain why the intensity we measure above the gap is reduced.

The inventors note that this scattering is more pronounced for the complete cylinder. This is to be expected as the path length through the full cylinder is twice as long as the path through the half cylinder. Therefore a greater proportion of incident light will undergo scattering events.

Furthermore, the transmission spectra was also recorded for the complete cylinder of a-triamond for a set of incident angles by rotating the sample, and the results are shown in as a polar heat map in FIG. 24A, where the radial coordinate describes the frequency and the angular coordinate the cylinder rotation angle. A broadly isotropic transmission gap is visible as the blue/green ring. The experimental results are corroborated by finite-difference time-domain (FDTD) simulations, shown in FIG. 24B, which predict a highly isotropic, and significantly deeper, gap.

Second Microwave Experiment Methodology

The two halves of the cylinder were separated by 8.5 mm, producing a cuboidal air channel between the two semi-cylinders. The channel was positioned parallel to the transition beam and the transmission measurement was then performed as explained above.

Second Microwave Experiment Results

The transmission spectra through the cylinder where the two halves are spaced apart to define a channel is shown in FIG. 20. The spectra for the complete cylinder which does not define a channel is also shown on the graph to allow comparisons to be made. It should be noted that only the smoothed data is shown.

As explained above, the inventors found that the complete cylinder strongly blocks the signal in the region of 19-23 GHz. In comparison significant transmission enhancement was observed in the band-gap region when the two halves of the cylinder were spaced apart to define a channel. This corresponds to the radiation passing through the guided mode being supported by the waveguide.

Accordingly, this suggests that a-trimond structures could be used to define waveguides.

EXAMPLE 6: NEAR-IR AND VISIBLE WAVELENGTHS

It will be appreciated that the operating wavelength of the a-triamond structure depends upon the cross member length.

Recently, high-quality realisations of a four-valent three-dimensional hyperuniform structure have been achieved through direct laser writing (DLW) (Muller, 2014, Haberko 2013). Notably, these structures have been realised at micron lengthscales, thus placing their operating wavelength into the near infrared.

Shrinking the linear dimensions of such structures by a factor of ~4 would bring their functionality into the visible regime. Further, these structures have been realised with materials having refractive indices ($TiO_2$ and silicon, refractive indices ~2.5 and ~3.6 respectively) which are large enough to endow the amorphous triamond structure described in example 3 with a complete PBG. Accordingly, samples of a-triamond could be manufactured using this method.

To determine the lengthscale at which a-triamond must be manufactured in order to have functionality in the near-IR it is necessary to perform a simple calculation. Inspection of FIG. 13 shows that frequency is measured in a dimensionless unit, $a/\lambda$, where $\lambda$ is the free space wavelength of some radiation and a is a scaling value. Specification of the desired central wavelength of the PBG as our X value and equating $a/\lambda$ to the central value of the PBG (~0.21 for a refractive index of 3.61, corresponding to silicon) allows the determination of a. This scaling value thus determines the physical dimensions of all aspects of the structure.

The a-triamond structure could be manufactured from silicon for applications at near-IR wavelengths, as used for many telecommunication applications, and $\lambda$ could be set as 1.5 µm accordingly. As a result, the average cross member lengths in this structure will be about 220 nm and the optimum radius of a cylindrical decoration will be about 95 nm. If a sufficiently large point pattern is used as the design basis of this realisation, then the realisation will possess a complete PBG covering the wavelength region (1.50±0.14) µm, or equivalently the frequency range (200±18) THz. This is shown in the photonic band structure shown in FIG. 17. The structure could be manufactured through direct laser writing and subsequent infiltration of the network by high refractive index silicon.

EXAMPLE 7: PRINCIPLE APPLICATIONS OF AMORPHOUS TRIAMOND

Complete PBG amorphous triamond can be used as a supporting matrix within which complex optical components, whose functionality is dependent on the surrounding band gap material, can be designed. Such components derive their functionality from combinations of waveguides and resonant cavities which are in optical communication with one another (please see Fan, Villeneuve and Joannopoulos, (1998) for an example of a channel-drop filter designed in a PBG structure).

Optical Filter & Waveguide

Referring to FIG. 21, the amorphous triamond may be used as an optical filter. The complete PBG prevents the passage of optical signals within a designer-controlled frequency window. In this embodiment, a sample of a-triamond according to the invention is disposed into a typical rectangular metallic waveguide, here seen in cross-section. The a-triamond is then used to prevent unwanted frequencies from passing from one waveguide to the other. This is shown in FIG. 21 where the signal in contains some frequency components within the bandgap, and these not present in the signal out as the material permits only non-band-gap frequencies to pass.]

It has been shown that PBG structures can support the waveguiding of light. A waveguide is a channel along which light can flow, like a river. Light is confined to the waveguide as the complete PBG acts as an optical insulator. Waveguides can be engineered by introducing a line of 'defects' into the PBG structure—normally by increasing or reducing the refractive index of the structure along this line. These defects couple together and support propagation of light along the line. Accordingly, by designing a line of defects in the a-triamond structure, it results in a low-loss waveguide.

Crystalline architectures can only support waveguides along their high-symmetry directions, which lacks design flexibility (Lin, 1998). Accordingly, a great advantage of disordered structures, such as a-triamond, is that they can support waveguides having arbitrary bending angles. A disordered structure can be designed from the ground up to encapsulate a channel having an arbitrary shape.

Design of an arbitrarily-shaped waveguide in amorphous triamond would likely proceed along similar lines to the design of the bulk structure. First, a waveguide path would be chosen. Secondly, a set of connected trihedra can be arranged to encapsulated this path (like a spring encapsulates its air core). Finally, the pathway would be surrounded with a random network of trivalently connected points and a WWW-type simulated annealing procedure would be employed to reduce this surrounding matrix to an amorphous triamond structure. The annealing protocol would focus on points in the surrounding matrix, making no alterations to the layer of points that define the waveguide's path. This would result in a tailor-made waveguide surrounded by complete PBG material.

The ability to design waveguides with arbitrary shapes gives the designer great flexibility. This could include the design of waveguide interconnections at 'Y-' or 'T-' shaped junctions such that the interconnected waveguides are in optical communication with each other. Each waveguide in such an interconnected system can be tailored to be formed from its own type of line defect such that a system may serve as a means of splitting a band of frequencies into two or more sub-bands having selectable frequencies. The ability to independently tune the component waveguide segments endows the designer with the power to filter a photonic input signal and create a virtually unlimited spectrum of output signals.

Waveguides are a key component in the design of frequency filters and light-guiding structures for telecommunications applications as well as complex two and three-dimensional next-generation all-optical computer chips.

Optical Insulator

The amorphous triamond according to the invention can be used as an optical insulator, totally isolating an optical system from external fields. As shown in FIG. 22, a delicate radiation-based experiment is being carried out at frequency $\omega$. A shell-like configuration of amorphous triamond with a complete band gap around frequency $\omega$ can be used to isolate this experiment from external radiation signals of the same frequency. External radiation cannot penetrate the insulating shell, allowing the experiment to be performed accurately inside.

Conversely, in another embodiment of optical insulator-like behaviour, light completely surrounded by this optical insulator can be totally trapped. Light trapping can be practically designed into a structure by engineering a 'defect' therein by altering the structure at some point. This defect supports a new mode of the electromagnetic field into which photons can be piled. These photons cannot escape as they are surrounded by the optical insulator. Cavities can be designed by those skilled in the art to have well-defined resonant frequencies—the quality factor (Q-factor) is a measure of how well-defined this frequency is. High Q-factor cavities can be engineered by removal or addition of dielectric material at some point within the structure. The local geometry can also be modified to improve the Q-factor. High Q-factor cavities are a basic building block of all-optical micro-circuitry—they can be used in the design of optical filters (Fan, 1998), laser design (Painter, 1999) and will likely find many future embodiments in complex all-optical microcircuitry (Chutinan, 2003).

Three-Dimensional all-Optical Circuitry

The above two applications can be built into an a-triamond matrix to produce complex three-dimensional all-optical circuitry. As shown in FIG. 23, this could include cavity modes and arbitrarily shaped and oriented waveguides in a configuration in which a plurality of such components are connected and in optical communication with one another. The waveguides and cavities are embedded in complete band gap amorphous trivalent network. Such a component could take some input wavepacket with a distribution of frequencies, and process it to produce a modified output wavepacket, with some desirable alternative frequency distribution.

Both resonant cavities and waveguides are basic building blocks that can be assembled together and placed in optical communication in order to achieve a complex optical functionality. These functionalities can include filtering, sensing and optical logic. A skilled designer could design such a structure in the manner described above, first defining the waveguides and building up complete PBG amorphous triamond around them, and then engineering resonant cavities by introducing defects at the desired sites.

Amorphous triamond can thus comprise any number of complex optical components, designed to extract functionality from combinations of optical cavities and waveguides which are in optical communication with one another. For example, Nozaki et al. employ two waveguides which are coupled together by a cavity to engineer an all-optical switch. Fan et al. have designed a channel drop filter by mediating the interaction between two waveguides through the use of two cavities. Components like these, and many more yet to be designed, will likely begin to replace power-inefficient electronic interconnects in telecoms signal processing applications.

Colouration

Another use of a-triamond is in the colouration of fabrics and paints. Structural colouration can be achieved by the manufacture of amorphous triamond structures with cross member lengths that are small enough to bring their operational wavelengths into the visual spectrum. Possible means of manufacture include cell culturing (Parker, 2014), in which natural processes are exploited to self-assemble a structure similar to amorphous triamond, and biological templating (Mille, 2013). It is also possible to imagine a self-assembly technique similar to the self-assembly of artificial opal structure from colloidal suspensions of polymer spheres (Kim, 2011). Such a technique would start from a colloidal suspension of dielectric trihedra which could be deposited by a clever designer to produce a network similar to amorphous triamond. However, such a small lengthscale embodiment is manufactured, millions of these microscale components could be suspended in paints or dispersed into fabrics to endow them with fade-proof colouration at wavelengths which are completely controllable.

EXAMPLE 7: PRINCIPLE APPLICATIONS OF AMORPHOUS TRIMENE

Although the a-trimene material produced in example 2 does not reliably possess a complete PBG, it is nonetheless observed to alter the electromagnetic response of free-space. This is often quantified with the concept of the density of states (DOS)—a measure of the number of electromagnetic modes available (into which light can couple) as a function of frequency. A complete PBG material will possess a frequency region within which the DOS drops to zero—this is the band gap, as there are no electromagnetic modes within the gap.

The inventors have observed signatures to suggest that a-trimene possesses a significant reduction of states in the frequency region of the band gap. As a result, a-trimene samples will display reduced transmission (i.e. increased reflection) for light within this frequency region. Accordingly, when manufactured on a sufficiently small characteristic length scale, a-trimene structures display artificial colouration. Such structural colouration is fade-proof and could be used to impart colour to paints and fabrics.

Structural colouration has particular significance to the a-trimene structures. It is suggested that they could be formed by the precipitation of nanoscale trihedral building blocks from a colloidal suspension (similar to the manufacture of opal structures by the deposition of polymer spheres from a colloidal suspension). This self-assembly approach would be an efficient mechanism for producing structures small enough to manipulate visible light. However, the inventors expect that it could only produce a-trimene type structures, having cross member length and cross member angle uniformity but no dihedral angle order. For this reason, there is significant value in the a-trimene structures in spite of their lack of complete PBG.

EXAMPLE 8: MATERIALS FOR A-TRIAMOND AND A-TRIMENE

It will be appreciated that it is the geometry and structure of a sample itself, rather than the exact material from which it is made, that is responsible for a significant reduction of states in a frequency region or a photonic band gap. However, a non-exhaustive list of materials from which a-triamond and a-trimene structures could be made is given below.

The refractive index of a material is a key determinant of its optical properties and response. It is defined as the square root of the relative dielectric permittivity. In general the refractive index is a complex number. Its real part is associated with the propagation of electric and magnetic fields within the material. Its negative part describes the attenuation of electric and magnetic fields by the material (the absorption of electromagnetic energy by the material).

The relevant property of the material is its relative dielectric permittivity—$\varepsilon_r$, equal to the square of the refractive index.

For a PBG material it is required that the permittivity of the material is be both large and predominantly real. In general, materials are dispersive; their permittivities vary according to the frequency of light with which they are interacting. Permittivities quoted here are estimates over the specified range of frequencies.

Materials that would yield a complete photon band gap, and so are suitable for producing a-triamond are:

Alumina, $Al_2O_3$—$\varepsilon_r$=9-10 at 9-34 GHz [Davidson (1972), Robertson (1991)](used for the microwave experiments)

Zirconia, $ZrO_2$—$\varepsilon_r$=32 at 15-140 GHz [Davidson (1972)]

Silicon—$\varepsilon_r$=11.6 at 26.5-40 GHz [Seeger (1988)]

For structural colouration applications, which are not contingent on the existence of a complete PBG, it is anticipated that the material has a largely real but substantially smaller refractive index and that the shape and volume of the decorations will be less relevant.

Accordingly, structural colouration materials which are suitable for producing a-trimene are:

Titania, $TiO_2$—$\varepsilon_r$=8.4-6.3 at 750-1700 THz (visible light) [Mille (2013)]

Silicon dioxide/Quartz, $SiO_2$—$\varepsilon_r$=~2.13 at 550 THz (visible light) [Malitson (1965)]

Common polymers such as Nylon—$\varepsilon_r$~3 at 2 GHz [Rueggeberg (1971)]

SUMMARY

The inventors have designed two brand new embodiments of materials, which they call amorphous triamond (a-triamond) and amorphous trimene (a-trimene). These are disordered, three-dimensional networks which are strictly trivalent, possessing local geometrical order to a greater or lesser extent.

There is less variability in the dihedral angle, skew angle and ring size in a-triamond than there is in a-trimene. However, there is more variability in the relative cross member length and cross member angle in a-triamond than there is in a-trimene.

The a-triamond structure exhibits large and complete photonic band gaps. Accordingly, triamond may be used to form a matrix into which optically resonant cavities and/or waveguides can be introduced. Accordingly, a-triamond is a valuable material allowing the design of advanced optical components for next-generation optical processing. Additionally, a-triamond could be used to produce fade-proof colouration for fabrics and paints.

While a-trimene does not have a large PBG, it is still observed to reduce the number of electromagnetic modes within a particular frequency range. Additionally, the increased disorder of the system, when compared to a-triamond, renders it highly suitable for production by self-assembly methods. These methods could be used to generate microparticles capable of producing fade-proof colouration for fabrics and paints.

REFERENCES

H. H. Li. Refractive index of silicon and germanium and its wavelength and temperature derivatives, J. Phys. Chem. Ref. Data 9, 561-658 (1993)

D. T. Pierce and W. E. Spicer, Electronic structure of amorphous Si from photoemission and optical studies, Phys. Rev. B 5, 3017-3029 (1972)

G. Barkema and Normand Mousseau. High-quality continuous random networks. Physical Review B, 62(8): 4985{4990, August 2000.

Chutinan. A, Sajeev John, and Ovidiu Toader. Diffractionless Flow of Light in All-Optical Microchips. Physical Review Letters, 90(12):123901, March 2003.

Davidson, J et al—Measurements on alumina and glasses using a TM020 mode resonant cavity at 9-34 GHz (1972).

Edagawa. K, Satoshi Kanoko, and Masaya Notomi. Photonic Amorphous Diamond Structure with a 3D Photonic Band Gap. Physical Review Letters, 100(1):013901, January 2008.

Fan. S, P Villeneuve, J Joannopoulos, and H Haus. Channel drop filters in photonic crystals. Optics Express, 3(1):4-11, 1998.

Florescu. M, Paul Steinhardt, and Salvatore Torquato. Optical cavities and waveguides in hyperuniform disordered photonic solids. Physical Review B, 87(16):165116, April 2013.

Haberko. J, and Frank Scheffold. Fabrication of mesoscale polymeric templates for three-dimensional disordered photonic materials. Optics express, 21(1):1057-1065, 2013.

Hajek. B, Cooling schedules for optimal annealing. Mathematics of operations research, 13(2):311-330, 1988.

Hejna. M, Paul J. Steinhardt, and Salvatore Torquato. Nearly hyperuniform network models of amorphous silicon. Physical Review B, 87(24):245204, June 2013.

Hejna. M, P J Steinhardt, and S Torquato. Nearly hyperuniform network models of amorphous silicon. PhD thesis, 2013.

Imagawa. S, Keiichi Edagawa, and Masaya Notomi. Strong light confinement in a photonic amorphous diamond structure. Applied Physics Letters, 100(15):151103, 2012.

Joannopoulos. J D, S G Johnson, J N Winn, and R D Meade. Photonic crystals: molding the flow of light. 2011.

Kumar. A, Mark Wilson, and M F Thorpe. Amorphous graphene: a realization of Zachariasen's glass. Journal of physics. Condensed matter: an Institute of Physics journal, 24(48):485003, December 2012.

Kim. S H, Su Yeon Lee, Seung-Man Yang, and Gi-Ra Yi. Self-assembled colloidal structures for photonics. NPG Asia Materials, 3(1):25{33, January 2011.

Lin. S. Experimental Demonstration of Guiding and Bending of Electromagnetic Waves in a Photonic Crystal. Science, 282(5387):274{276, October 1998.

Malitson, I—Interspecimen Comparison of the Refractive Index of Fused Silica (1965). JOURNAL OF THE OPTICAL SOCIETY OF AMERICA, VOLUME 55, NUMBER 10

Man. W, Marian Florescu, Kazue Matsuyama, Polin Yadak, Geev Nahal, Seyed Hashemizad, Eric Williamson, Paul Steinhardt, Salvatore Torquato, and Paul Chaikin—Photonic band gap in isotropic hyperuniform disordered solids with low dielectric contrast Optics Express Vol. 21, Issue 17 pp. 19972-19981 (2013) •doi: 10.1364/OE.21.019972

Man. W, Mischa Megens, Paul J Steinhardt, and P M Chaikin. Experimental measurement of the photonic properties of icosahedral quasicrystals. Nature, 436 (7053):993{6, August 2005.

Man. W, Marian Florescu, Eric Paul Williamson, Yingquan He, Seyed Reza Hashemizad, Brian Y C Leung, Devin Robert Liner, Salvatore Torquato, Paul M Chaikin, and Paul J Steinhardt. Isotropic band gaps and freeform waveguides observed in hyperuniform disordered photonic solids. Proceedings of the National Academy of Sciences of the United States of America, 110(40):15886{91, October 2013.

Metropolis. N, Arianna W. Rosenbluth, Marshall N. Rosenbluth, Augusta H. Teller, and Edward Teller. Equation of State Calculations by Fast Computing Machines. The Journal of Chemical Physics, 21(6):1087, 1953.

Mille. C, Eric C. Tyrode, and Robert W. Corkery. 3D titania photonic crystals replicated from gyroid structures in butterfly wing scales: approaching full band gaps at visible wavelengths. RSC Advances, 3(9):3109, 2013.

Muller. N, Jakub Haberko, Catherine Marichy, and Frank Scheffold. Silicon Hyperuniform Disordered Photonic Materials with a Pronounced Gap in the Shortwave Infrared. Advanced Optical Materials, 2(2):115-119, February 2014.

Nozaki, K et al—Sub-femtojoule all-optical switching using a photonic-crystal nanocavity—(2010). DOI: 10.1038/NPHOTON.2010.89

Painter. O, Rk Lee, a Scherer, a Yariv, Jd O'Brien, Pd Dapkus, and I Kim. Two-dimensional photonic band-Gap defect mode laser. Science (New York, N.Y.), 284(5421): 1819{21, June 1999.

Parker. A R and Helen Elizabeth Townley. Making photonic structures via cell culture: Morpho butterfly scales. Bioinspired, Biomimetic and Nanobiomaterials, pages 1-5, 2014.

Robertson, W et al—Microwave dielectric measurements of zirconiaalumina ceramic composites: A test of the Clausius-Mossotti mixture equations. Journal of Applied Physics 70, 7648 (1991); doi: 10.1063/1.349700

Rodriguez. A, M Ibanescu, J D Joannopoulos, and Steven G Johnson. Disorder-immune confinement of light in photonic-crystal cavities. Optics letters, 30(23):3192{4, December 2005.

Rueggeberg, W—Determination of Complex Permittivity of Arbitrarily Dimensioned Dielectric Modules at Microwave Frequencies (1971).

Seeger, K—Microwave dielectric constants of silicon, gallium arsenide, and quartz—Journal of Applied Physics 63, 5439 (1988); doi: 10.1063/1.341153

Street. R. A—Hydrogenated Amorphous Silicon. Cambridge University Press, 1991.

Sunada. T, Crystals That Nature Might Miss Creating. Notices of the AMS, 55(2):208-215.

Vink. R, and G T Barkema. Towards device-size atomistic models of amorphous silicon. arXiv preprint cond-mat/ . . . , (1):1-7, 2001.

Wooten. F, K Winer, and D Weaire. Computer generation of structural models of amorphous Si and Ge. Physical review letters, 54(13):1392{1395, 1985.

Wright. C, and M. F. Thorpe. Eighty years of random networks. Physica Status Solidi (B), 250(5):931-936, May 2013.

Yoshie. T, Axel Scherer, Hao Chen, and Dennis Deppe. High quality two-dimensional photonic crystal slab cavities. Applied Physics Letters, 79(26):4289, 2001.

Zachariasen. W. H.—The Atomic Arrangement in Glass. Journal Am. Chem. Soc., 196(1):3841{3851, 1932.

The invention claimed is:

1. A composition comprising a three-dimensional amorphous trivalent network, wherein the network defines a connected network comprising a plurality of vertices which are interconnected by cross members such that each cross member directly connects two vertices and the network comprises a plurality of trihedra, wherein each trihedron comprises a central vertex which is directly connected to three outer vertices such that each trihedron defines three skew angles, a skew angle being the angle between the normal of a plane, comprising the central vertex of the trihedron and two of the outer vertices, and between a cross member which directly connects the central vertex and the remaining outer vertex of the trihedron which does not form the plane, and any first and second trihedra comprising one shared cross member and two shared vertices define a dihedral angle which is the angle between the normal to a first plane, defined by a central vertex and two outer vertices of the first trihedron, wherein the two outer vertices which define the first plane do not comprise the second trihedron, and the normal to a second plane, defined by a central vertex and two outer vertices of the second trihedron, wherein the two outer vertices which define the second plane do not comprise the first trihedron, wherein the dihedral angle is greater than or equal to 90°, wherein at least 90% of the skew angles within the network define an angle between 70° and 110° and at least 90% of the dihedral angles within the network define an angle between 92° and 155° such that the amorphous trivalent network reduces within a particular frequency range ($\omega_c \pm \Delta\omega$) the number of modes of electromagnetic radiation passing through the network, wherein the amorphous trivalent network defines a band gap having a width of at least 5%.

2. The composition according to claim 1, wherein the amorphous trivalent network of the composition defines a photonic band gap (PBG), and/or wherein the band gap is a complete, or three-dimensional, band gap.

3. The composition according to claim 1, wherein each cross member defines a length which is the spatial distance between the two vertices directly connected by the cross member, and at least 90% of the cross members within the network of the composition define a length between 70% and 130% of a mean cross member length, optionally wherein each cross member defines a width which is between 60% and 120% of the mean cross member length.

4. The composition according to claim 1, wherein each trihedron defines three cross member angles which is the angle between two cross members extending from the central vertex, and at least 90% of the cross member angles within the network define an angle between 80° and 160°.

5. The composition according to claim 1, wherein at least 90% of the skew angles within the network define an angle between 75° and 105°.

6. The composition according to claim 1, wherein at least 90% of the dihedral angles within the network define an angle between 93° and 149°.

7. The composition according to claim 1, wherein each cross member defines a length which is the spatial distance between the two vertices directly connected by the cross member, and at least 90% of the cross members within the network of the composition define a length between 85% and 115% of the mean cross member length, optionally wherein each cross member defines a width which is between 60% and 120% of the mean cross member length.

8. The composition according to claim 1, wherein each trihedron defines three cross member angles which is the angle between two cross members extending from the central vertex, and at least 90% of the cross member angles within the network define an angle between 95° and 140°.

9. The composition according to claim 1, wherein at least 90% of the skew angles within the network define an angle between 35° and 135°.

10. The composition according to claim 1, wherein the dihedral angle is greater than or equal to 90° and at least 90% of the dihedral angles within the network define an angle between 90° and 170°.

11. A structural colouration material comprising the composition according to claim 1.

12. A paint, dye or fabric comprising the structural colouration material according to claim 11.

13. A supporting matrix comprising the composition according to claim 1 configured to define at least one optical component.

14. The supporting matrix according to claim 13, wherein the supporting matrix is configured for use in the processing of optical signals for telecommunications or for use in the processing of optical signals in the microwave K-Band.

15. The supporting matrix according to claim 13, wherein the at least one optical component comprises a waveguide, a waveguide interconnection, a resonant cavity, and/or an optical filter.

16. A frequency filter; a light-guiding structure for a telecommunications application; a light-guiding structure for a satellite communications and/or mobile telephone application; an optical computer chip; an optical microcircuit; or a laser, each comprising the supporting matrix of claim 13.

* * * * *